(12) United States Patent
Kisu

(10) Patent No.: US 6,897,840 B2
(45) Date of Patent: May 24, 2005

(54) DISPLAY APPARATUS

(75) Inventor: Hiroki Kisu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 10/025,536

(22) Filed: Dec. 26, 2001

(65) Prior Publication Data

US 2002/0089279 A1 Jul. 11, 2002

(30) Foreign Application Priority Data

Dec. 28, 2000 (JP) .................................... 2000-403164

(51) Int. Cl.[7] ............................................. G09G 3/36
(52) U.S. Cl. ...................................... 345/87; 359/269
(58) Field of Search ........................... 345/85, 86, 87, 345/107; 359/269, 290; 349/150, 153

(56) References Cited

U.S. PATENT DOCUMENTS

| | | | | |
|---|---|---|---|---|
| 4,739,349 A | * | 4/1988 | Lewiner et al. | 347/140 |
| 5,038,158 A | * | 8/1991 | Ayers et al. | 347/55 |
| 6,421,035 B1 | * | 7/2002 | Sheridon et al. | 345/85 |
| 6,515,790 B2 | * | 2/2003 | Miyamoto et al. | 359/296 |
| 2004/0012828 A1 | * | 1/2004 | Soda | 358/474 |

FOREIGN PATENT DOCUMENTS

| | | | | |
|---|---|---|---|---|
| JP | 363276620 A | * | 11/1988 | ............. G09F/3/03 |
| JP | 1-222292 | | 9/1989 | |
| JP | 20011060144 A | * | 3/2001 | ......... G02F/1/1333 |

* cited by examiner

Primary Examiner—Amare Mengistu
(74) Attorney, Agent, or Firm—Fitzpatrick, Cella, Harper & Scinto

(57) ABSTRACT

An image display apparatus includes an image display portion formed of a pair of substrates disposed opposite to each other and having a peripheral edge sealed in order to form a sealed gap, and an insulating liquid and a plurality of coloring charged particles disposed in the sealed gap. The image display apparatus controls positions of the coloring charged particles and displays an image. The apparatus includes a movable sheet member disposed to be movable in the gap between the pair of substrates, a writing unit arranged outside the image display portion, and a unit for moving the movable sheet member and writing unit in a direction substantially parallel to the substrates and in a second direction substantially perpendicular to the first direction.

21 Claims, 29 Drawing Sheets

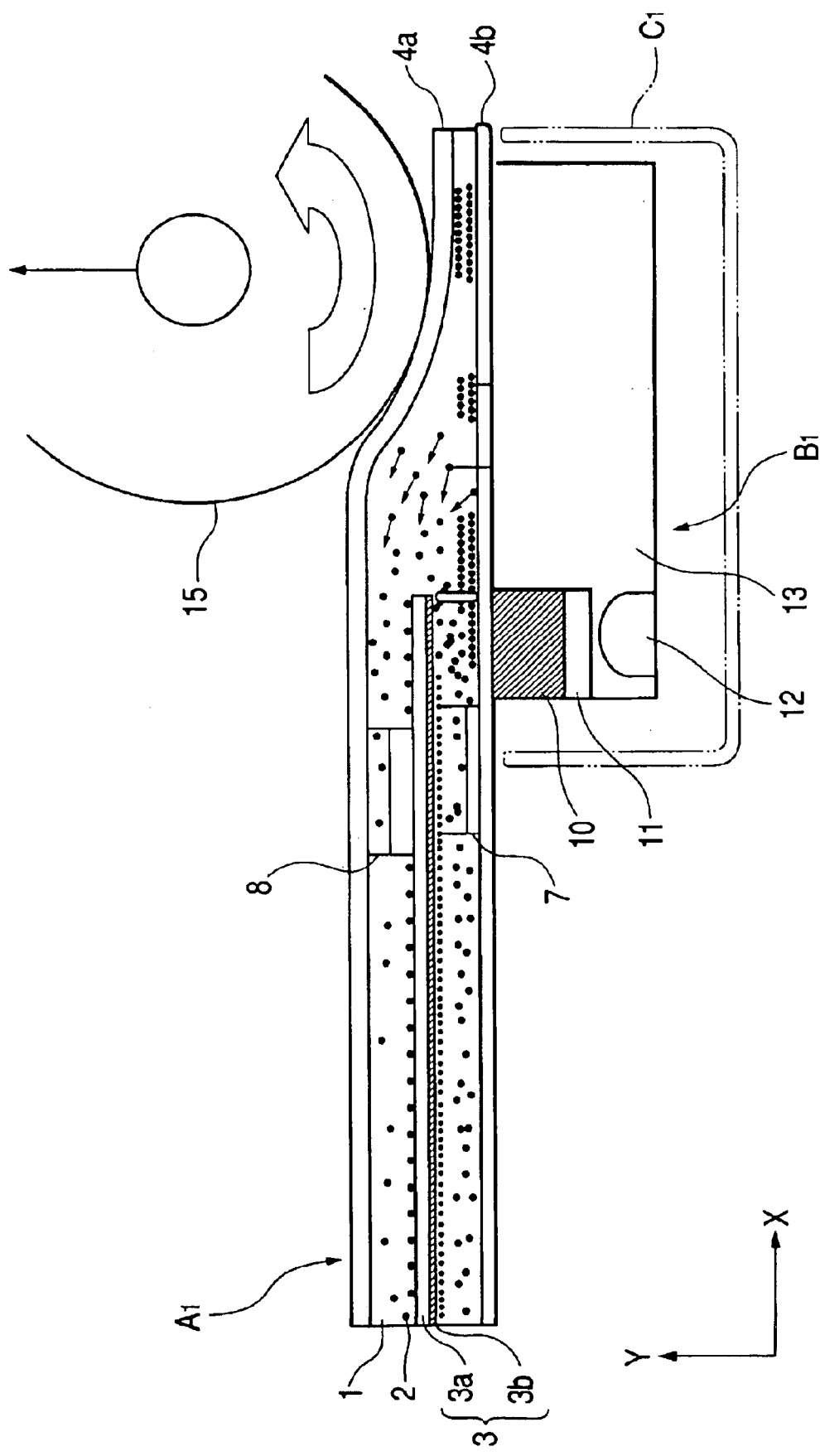

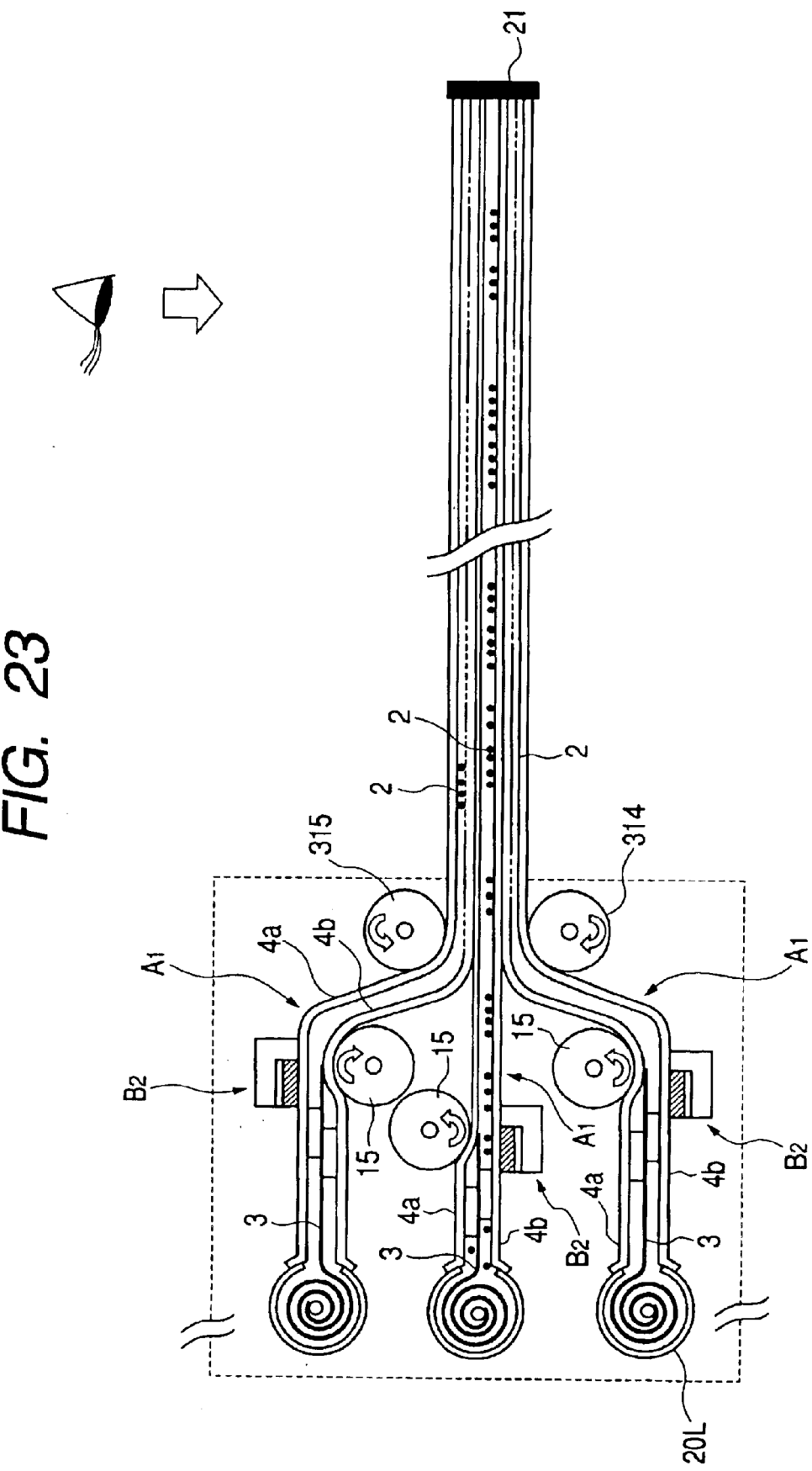

DISPLAY APPARATUS

BACKGROUND OF THE INVENTION

1. Field of the Invention

The present invention generally relates to a display apparatus for controlling a position of a coloring charged particle and displaying an image.

2. Related Background Art

In recent years, a liquid crystal panel has broadly been utilized as a display apparatus for displaying an image.

The liquid crystal panel has little power consumption and is superior in mobile property. Moreover, the panel does not easily tire eyes as compared with a cathode ray tube (CRT), light emitting diode (LED), and the like. On the other hand, a type of the liquid crystal panel which does not use a back light has a problem of bad contrast, and a type which uses the back light easily tires the eyes (as compared with the type which does not use the back light).

Then, as a display apparatus for solving these problems, an electrophoresis display apparatus has been proposed in Japanese Patent Application Laid-Open No. 1-222292.

As shown in FIG. 31, the display apparatus comprises a pair of substrates 4a, 4b which are disposed at a predetermined gap, the gap is filled with an insulating liquid 1 formed of xylene, dye, and surface-active agent, and coloring charged particles 2 such as $TiO_2$ particles are further dispersed in the gap. Moreover, a voltage applied to the coloring charged particles 2 is controlled by a unit of pixel so that positions of the particles are controlled, and the image is entirely displayed in this constitution.

Additionally, reference numerals 400a, 400b denote transparent electrodes which are disposed so as to hold the coloring charged particles 2 and insulating liquid 1 therebetween and to which a constant voltage is applied, 10 denotes a photoconductive layer (a-SiC layer), and 12 denotes a light emitting diode array for irradiating the photoconductive layer 10 with light. In this apparatus, while the constant voltage is applied to the pair of transparent electrodes 400a, 400b, and the photoconductive layer 10 is irradiated with the light from the light emitting diode array 12, a carrier is generated in the photoconductive layer 10, and an electric field strength between the photoconductive layer 10 and the transparent electrode 400b increases. However, while the light emitting diode array 12 is moved along the substrate 4b in a direction of an arrow 401, irradiation/non-irradiation is controlled by the unit of pixel. Thereby, the positions of the coloring charged particles 2 can be controlled by the unit of pixel.

Additionally, in the aforementioned electrophoresis display apparatus, a space between the pixels is partitioned by a spacer 402, so that the coloring charged particles 2 are prevented from moving to other pixels, the number of coloring charged particles 2 in each pixel is prevented from changing, and display quality just after manufactured is maintained.

However, it is very difficult to dispose an equal amount of coloring charged particles 2 in the respective pixels partitioned by the spacer 402. Therefore, when the number of coloring charged particles 2 is not uniform, the display quality is disadvantageously deteriorated.

Moreover, when the space between the pixels is partitioned by the spacer 402, the insulating liquid 1 is not agitated. Therefore, micro particles adhere to one another, display unevenness easily occurs by sedimentation, and it is difficult to secure stability with an elapse of time. Furthermore, since the spacer 402 is disposed, an aperture ratio is deteriorated, flexibility of the display apparatus is deteriorated, and the display apparatus is thickened.

SUMMARY OF THE INVENTION

The present invention has been developed in consideration of the aforementioned circumstances, and an object thereof is to provide an image display apparatus which includes a pair of substrates disposed opposite to each other and having a peripheral edge sealed in order to form a sealed gap, and an image display portion formed of an insulating liquid and a plurality of coloring charged particles disposed in the sealed gap, and which controls positions of the coloring charged particles and displays an image.

According to a first aspect of the present invention, there is provided an image display apparatus which comprises an image display portion comprised of a pair of substrates disposed opposite to each other and having a peripheral edge sealed in order to form a sealed gap and an insulating liquid and a plurality of coloring charged particles disposed in the sealed gap, and which controls positions of the coloring charged particles so as to display an image, the apparatus comprising:

an electrode sheet disposed to be movable in the gap between the pair of substrates;

a writing unit arranged opposite to an electrode surface of the electrode sheet and outside the image display portion; and a unit for moving the electrode sheet and the writing unit in parallel to the substrates and in a direction of a right angle to the arrangement.

According to a second aspect of the present invention, there is provided an image display apparatus which comprises an image display portion comprised of a pair of substrates disposed opposite to each other and having a peripheral edge sealed in order to form a sealed gap and an insulating liquid and a plurality of coloring charged particles disposed in the sealed gap, and which controls positions of the coloring charged particles so as to display an image, the apparatus comprising:

a movable sheet member which is disposed to be movable in the gap between the pair of substrates, and which comprises means for stirring the insulating liquid of the image display portion by movement and simultaneously stripping the charged particles from the substrates; and a writing unit which is arranged outside the image display portion, and which moves in parallel to the substrate and in a direction of a right angle to the arrangement while applying, an electric field to the charged particles of the image display portion so as to write the image.

According to a third aspect of the present invention, there is provided an image display apparatus which comprises an image display portion comprised of a pair of substrates disposed opposite to each other and having a peripheral edge sealed in order to form a sealed gap and an insulating liquid and a plurality of coloring charged particles disposed in the sealed gap, and which controls positions of the coloring charged particles so as to display an image, the apparatus comprising:

an electrode sheet which is disposed to be movable in the gap between the pair of substrates, which comprises means for stirring the insulating liquid of the image display portion by movement and simultaneously stripping the charged particles from the substrates, and which applies a cleaning voltage during or after the movement and thereby performs cleaning of the coloring charged particles; and a writing unit which is arranged opposite to an electrode surface of the electrode sheet and outside the image display portion, and which moves in parallel to the substrate and in a direction of a right angle to the arrangement while applying, an electric field to the charged particles of the image display portion so as to write the image.

BRIEF DESCRIPTION OF THE DRAWINGS

FIG. 2 is a detailed sectional view showing the structure of the display apparatus according to the present invention;

FIG. 21A shows that the display apparatus is wound up and contained in the mobile phone, and FIG. 21B shows that the display apparatus is drawn out;

FIG. 22A shows that the display apparatus is wound up and contained in the car navigation apparatus, and FIG. 22B shows that the display apparatus is drawn out;

FIG. 23 is a sectional view showing one example of the structure of the display apparatus according to the present invention;

DETAILED DESCRIPTION OF THE PREFERRED EMBODIMENT

An embodiment of the present invention will be described hereinafter with reference to FIG. 1, and the like.

Figure 1:
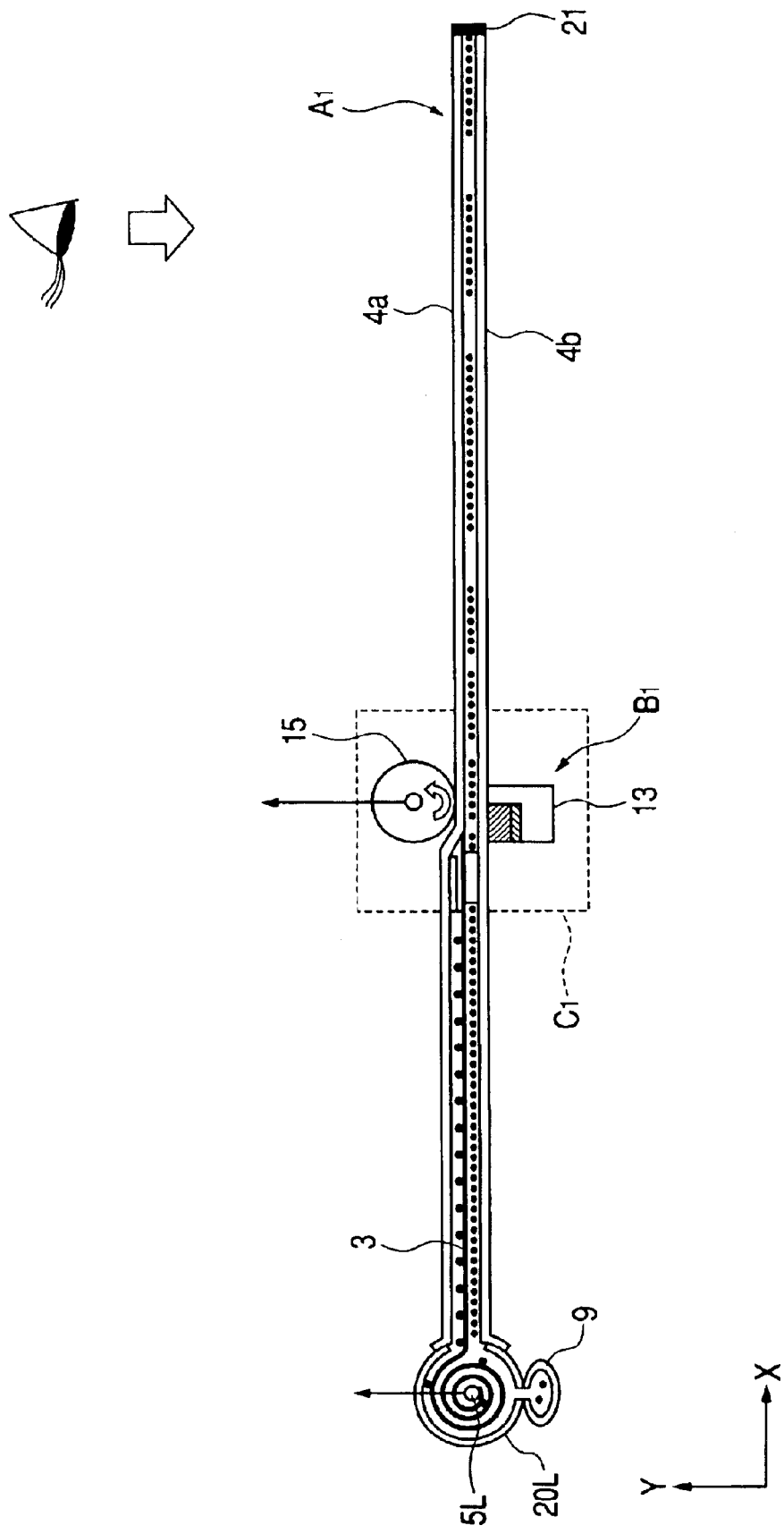
FIG. 1 is a sectional view showing one example of a structure of a display apparatus according to the present invention.

For example, as shown in FIG. 1, a display apparatus according to the present invention includes at least one image display portion $A_1$ as a portion for displaying an image and at least one image writing portion $B_1$ as means for writing the image. These image display portion $A_1$ and image writing portion $B_1$ are disposed opposite to each other. As shown in detail in FIG. 2, the image display portion $A_1$ has an insulating liquid 1 and a plurality of coloring charged particles 2 inside, and a movable member 3 is movably disposed in the insulating liquid. Moreover, the image writing portion $B_1$ is constituted to control positions of the coloring charged particles 2 in the image display portion $A_1$ so that the image is displayed. These image display portion $A_1$ and image writing portion $B_1$ may have a constitution which cannot be separated or which can be separated. In the constitution which can be separated, the image writing portion $B_1$ can be installed in a house, store, work place, and the like, while only the image display portion $A_1$ can be carried.

First, the image display portion $A_1$ will be described in detail.

As shown in FIG. 2, in the image display portion $A_1$, a pair of substrates 4a, 4b are disposed opposite to each other, a peripheral edge is bonded/sealed in order to form a sealed gap, and the insulating liquid 1 and coloring charged particles 2 are disposed in the sealed gap. Moreover, the movable member 3 is constituted to be movable in a direction along the substrates 4a, 4b.

Additionally, examples of a method for controlling the positions of the coloring charged particles 2 include a method in which an electric force is utilized, and a method in which a magnetic force is utilized. When the former method is used, the substrates 4a and 4b have to be rich in insulating property, and concrete examples of the substrates include a sheet material rich in flexibility such as polyethylene terephthalate (PET). At least one substrate in the pair of substrates 4a, 4b has to be transparent, but the other may have white or another color. Additionally, to form the sealed gap, the peripheral edge of the substrates 4a, 4b may be sealed.

Moreover, the movable member 3 has various functions such as image writing, and image deletion, and is formed as an electrode sheet with a first electrode 3b formed thereon for electric image writing. In this case, the movable member 3 is constituted of an insulating sheet 3a, and the first electrode 3b may be formed on the surface of the sheet. Examples of the insulating sheet 3a include polyethylene terephthalate (PET), and examples of the first electrode 3b include a deposited layer (conductive thin film) such as aluminum. Additionally, when the magnetic force is utilized to control the positions of the coloring charged particles 2, instead of forming the electrode on the movable member 3, functions such as image deletion (e.g., a function for agitating the insulating liquid 1, or stripping the attached coloring charged particles 2 from the substrate 4b) may be added to the member.

Figure 10:
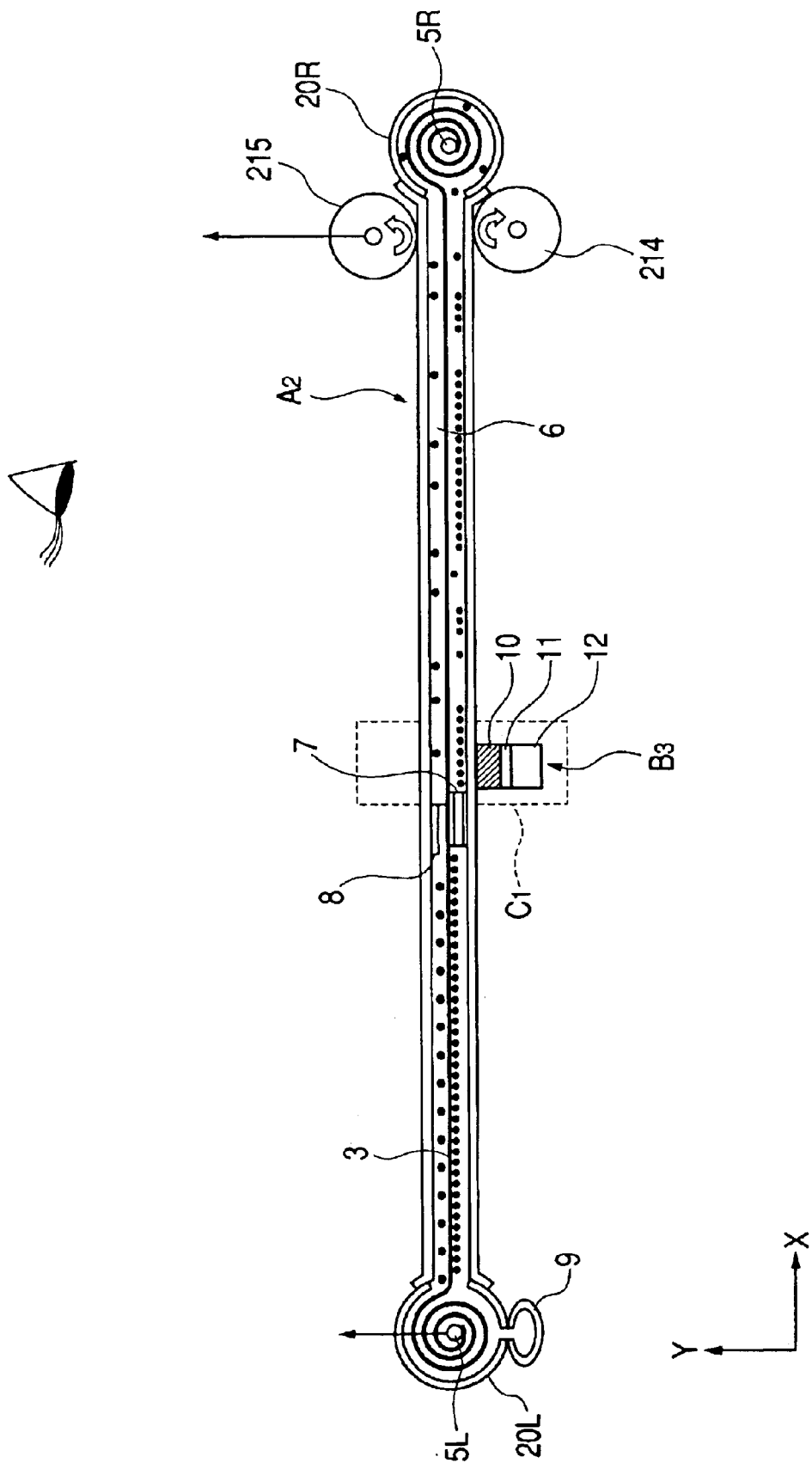
FIG. 10 is a sectional view showing another example of the structure of the display apparatus according to the present invention.

Additionally, examples of a method for moving the movable member 3 include: a method of forming the movable member 3 into a sheet member substantially rich in flexibility, attaching one edge of the movable member 3 to a first wind-up shaft 5L as shown in FIG. 1, and manually or automatically rotating the first wind-up shaft 5L; and a method of attaching one edge of the movable member 3 to the first wind-up shaft 5L, further attaching the other edge of the movable member 3 to another second wind-up shaft 5R as shown in FIG. 10, and the like, and manually or automatically rotating these wind-up shafts 5L, 5R. With the movable member 3 formed of a material which does not easily buckle, when the method shown in FIG. 1 is used, a structure can be simplified. With use of the method shown in FIG. 10, even the movable member 3 formed of a material which easily buckles can smoothly be moved. Additionally, as shown in FIGS. 1, 10, and the like, the wind-up shafts 5L, 5R are disposed in cylindrical members 20L, 20R connected to the substrate gap. However, the shafts may be disposed in hollow members other than the cylindrical members, or may be disposed in the substrate gap without disposing the hollow members 20L, 20R. Moreover, in FIG. 1, the movable member 3 is directly attached to the first wind-up shaft 5L, but another connection member (flexible member) may be attached to the movable member 3 and further attached to the first wind-up shaft 5L. Furthermore, in FIG. 10, a connection member 6 is attached to the movable member 3 and further attached to the second wind-up shaft 5R, but the movable member 3 may directly be attached to the second wind-up shaft 5R. Examples of the connection member 6 include: a transparent sheet member (e.g., transparent PET); a sheet member formed by hollowing out a portion corresponding to an image display portion (see FIG. 12); and a linear member rich in flexibility (e.g., a fine line formed of a metal or a resin).

Figure 3A:
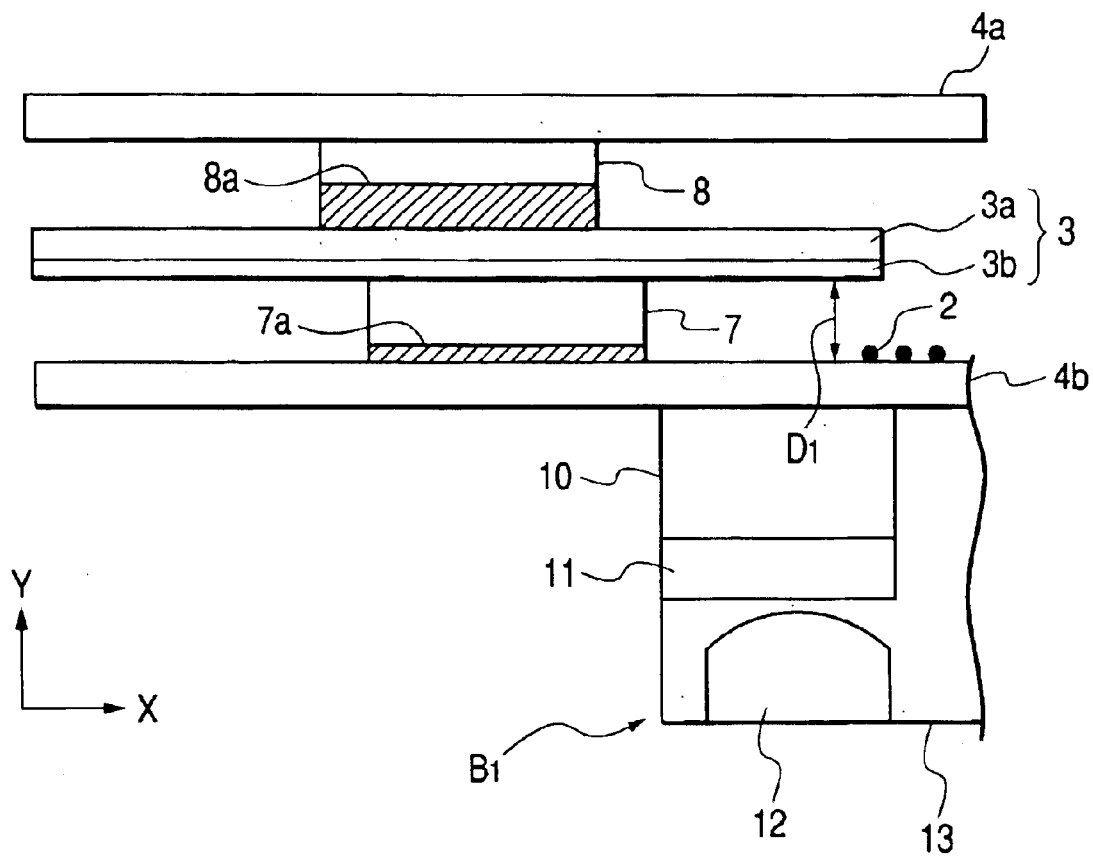
FIGS. 3A and 3B are diagrams showing a detailed structure of a lower block, upper block, and developing head.

On the other hand, as shown in FIGS. 2 and 3A in detail, a slide contact member 7 may be attached to the movable member 3 on a side on which the image writing portion $B_1$ is disposed. The slide contact member 7 may be constituted so as to be slid on the surface of the substrate 4b with movement of the movable member 3 in a direction along the substrates 4a, 4b. Thereby, when the movable member 3 is moved, the coloring charged particles 2 sticking to the surface of the substrate 4b can be stripped and removed. Additionally, in order to maintain a slide contact state between the slide contact member 7 and the substrate 4b, a spacer member 8 may be disposed between the other substrate 4a and the movable member 3 so that the slide contact member 7 is not easily detached from the substrate 4b.

The slide contact member 7 may be disposed in the vicinity of the image writing portion $B_1$ and in a position which does not overlap the image writing portion $B_1$. When the portion is disposed in this position, the slide contact member 7 can remove the coloring charged particles 2 and also keep a distance $D_1$ between the first electrode 3b and the substrate 4b to be constant (details will be described later). Additionally, in FIG. 3A, the image writing portion $B_1$ is disposed in a position opposite to a tip end of the first electrode 3b (via the substrate 4b), and the slide contact member 7 is disposed in a position other than a tip end portion of the movable member 3. Of course, this is not limited. As long as the slide contact member 7 and then the image writing portion $B_1$ (and the electrode 3b in a portion disposed opposite to the image writing portion $B_1$,) pass in order in an image writing process (details will be described later), these slide contact member 7 and image writing portion $B_1$ (and the electrode 3b in the portion disposed opposite to the image writing portion $B_1$,) may be disposed in other portions.

Figure 3B:
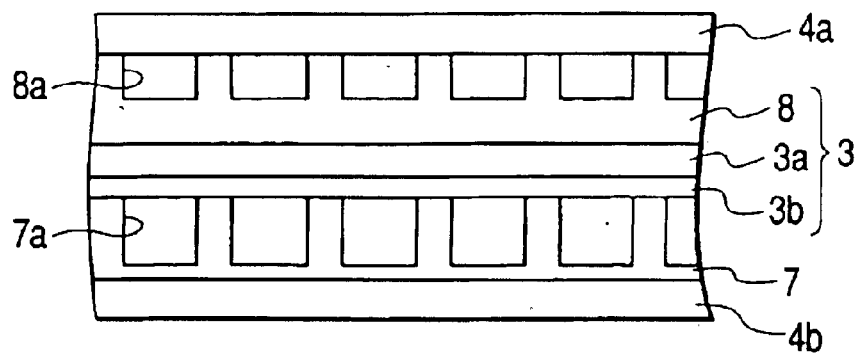

Furthermore, as shown in FIGS. 3A and 3B in detail, through holes 7a, 8a may be formed in the slide contact member 7 and spacer member 8 in a movement direction of the movable member 3. Thereby, when the movable member 3 is moved, the insulating liquid 1 and coloring charged particles 2 are passed through the through holes 7a, 8a. Accordingly, the insulating liquid 1 is agitated, and the coloring charged particles 2 are uniformly dispersed in the insulating liquid. As a result, stabilization of a micro-particle charging amount, prevention of fusing, and squeezing effect can be achieved.

Additionally, the insulating liquid 1 is preferably transparent, but may slightly be colored. Examples of the transparent insulating liquid 1 include isoparaffin (trade name; Isoper). Additionally, a charging control agent for charging the coloring charged particles 2 may be added to the insulating liquid 1.

Moreover, examples of the coloring charged particles 2 include acrylic styrene colored by carbon black.

The image writing portion $B_1$ as writing unit will next be described.

Examples of a method for controlling the positions of the coloring charged particles 2 include a method in which an electric force is utilized, and a method in which a magnetic force is utilized. When the former method is implemented, as shown in FIGS. 2 and 3A in detail, the first electrode 3b may be formed on the movable member 3 in the image display portion $A_1$, and the image writing portion $B_1$ may be constituted of a photosensitive member 10 disposed in a position opposite to the substrate 4b, a second electrode 11 disposed to hold the photosensitive member 10 with the first electrode 3b, and a light source 12 for irradiating the photosensitive member 10 with light. Alternatively, the image writing portion may be constituted of a large number of electrodes arranged in one row (e.g., a multi-stylus electrode, electrode prepared by printing a pattern with a conductive coating, electrode prepared using an etching technique, and the like), so that magnitudes of voltages of the respective electrodes are individually controlled.

Here, the photosensitive member 10 may be constituted of a charge transport layer and charge generation layer, and formed of an organic photosensitive member, a-Si, selenium photoconductor, deposited layers such as ZnO, ZnS, CdS, ZnCdS, PbO, powder resin dispersion layer, and the like. Moreover, the light source 12 may be constituted by arranging a large number of LEDs, and may be disposed behind the second electrode 11. In this case, transparent indium tin oxide (ITO) may be used in the second electrode 11 so that the light from the LED is transmitted. Moreover, the photosensitive member 10 needs to be prevented from being irradiated with lights other than the light of the light source 12. For this, the photosensitive member 10 may be enclosed in a housing (see $C_1$ of FIG. 2).

Additionally, the image display portion $A_1$ is constituted so as to be rich in flexibility. As shown in FIG. 2, a pair of first pressing members 13, 15 are disposed so as to hold the image display portion $A_1$ therebetween. When the image writing ends, these first pressing members 13, 15 press the image display portion $A_1$ while moving along the substrates 4a, 4b. Thereby, the insulating liquid 1 and coloring charged particles 2 in the sealed gap are successively pushed out of an image formed region. In the apparatus shown in FIG. 2, one first pressing member 15 is a roller, and the other first pressing member 13 is a support member for supporting the LED 12. These pressing members 13, 15 are constituted to move synchronously with the photosensitive member 10 while keeping a constant distance from the member 10. However, as shown by reference numerals 214, 215 in FIG. 10, the members may be constituted to be freely movable separately from the photosensitive member 10. Both the first pressing members 214, 215 may be constituted of rollers. In this case, a voltage having the same polarity as that of the coloring charged particles 2 may be applied to the first pressing members 15, 215 to such an extent that the micro particles 2 are not agitated. Thereby, the coloring charged particles 2 can effectively be removed from the image formed region.

On the other hand, as shown in FIG. 1, a liquid pressure adjustment chamber 9 may be connected to the sealed gap. The liquid pressure adjustment chamber 9 is formed of elastic materials such as rubber, and increases its capacity and contains a surplus insulating liquid, when the first pressing members 13, 15, or 214, 215 press the insulating liquid 1. In other cases (with a small amount of surplus insulating liquid), the chamber contracts.

Figure 6:
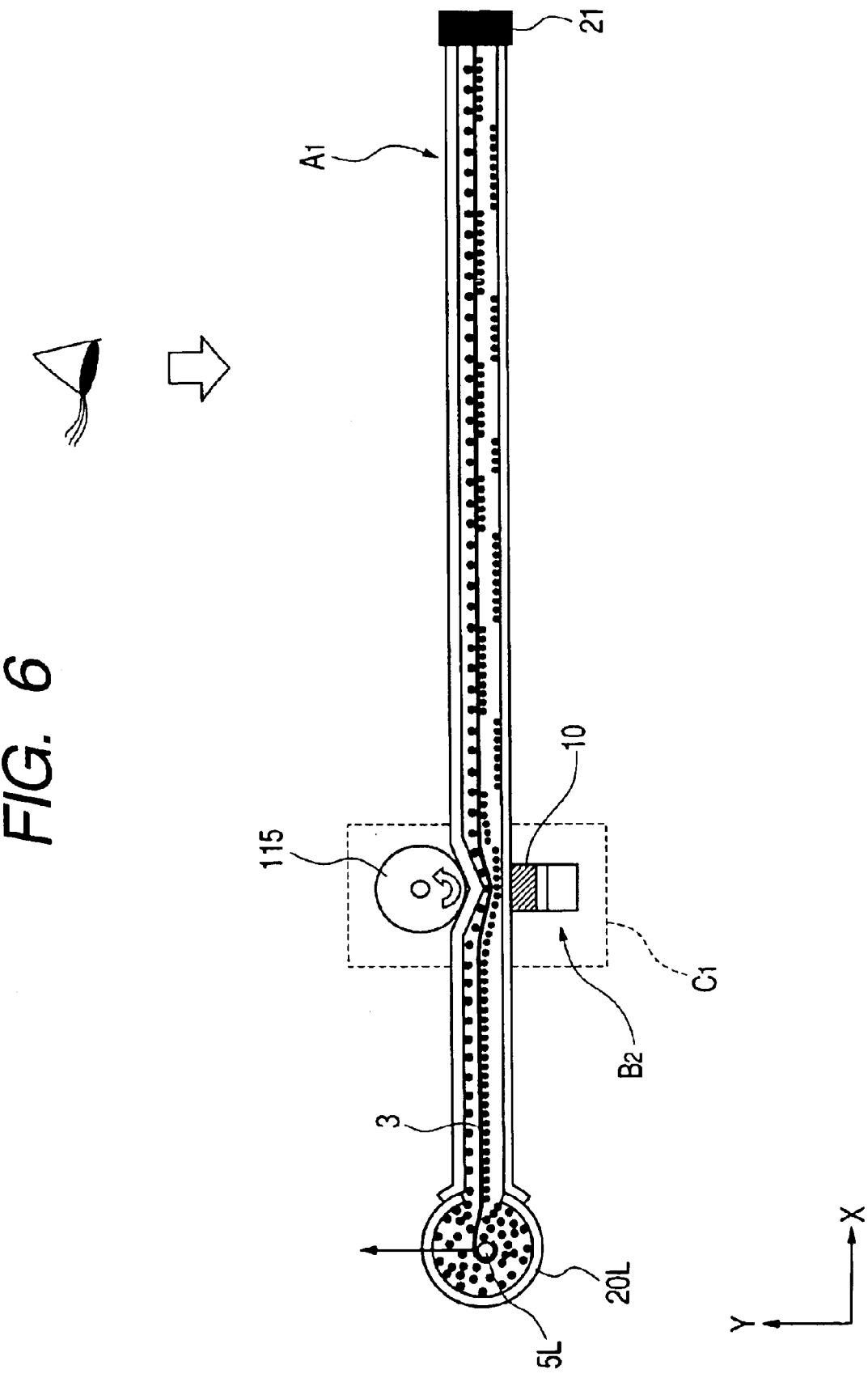
FIG. 6 is a sectional view showing a further example of the structure of the display apparatus according to the present invention.
Figure 7:
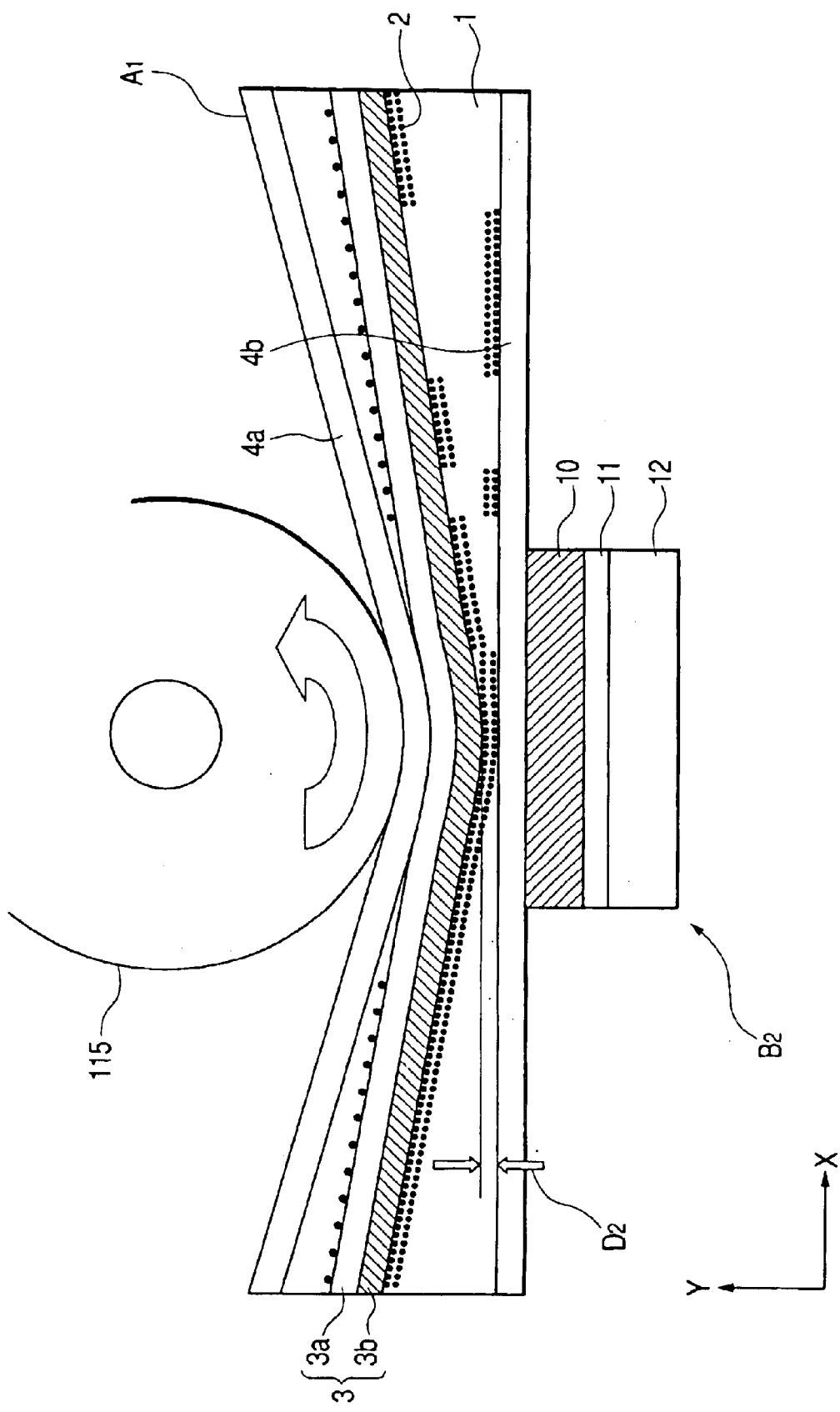
FIG. 7 is a detailed sectional view showing the structure of the display apparatus according to the present invention.
Figure 8:
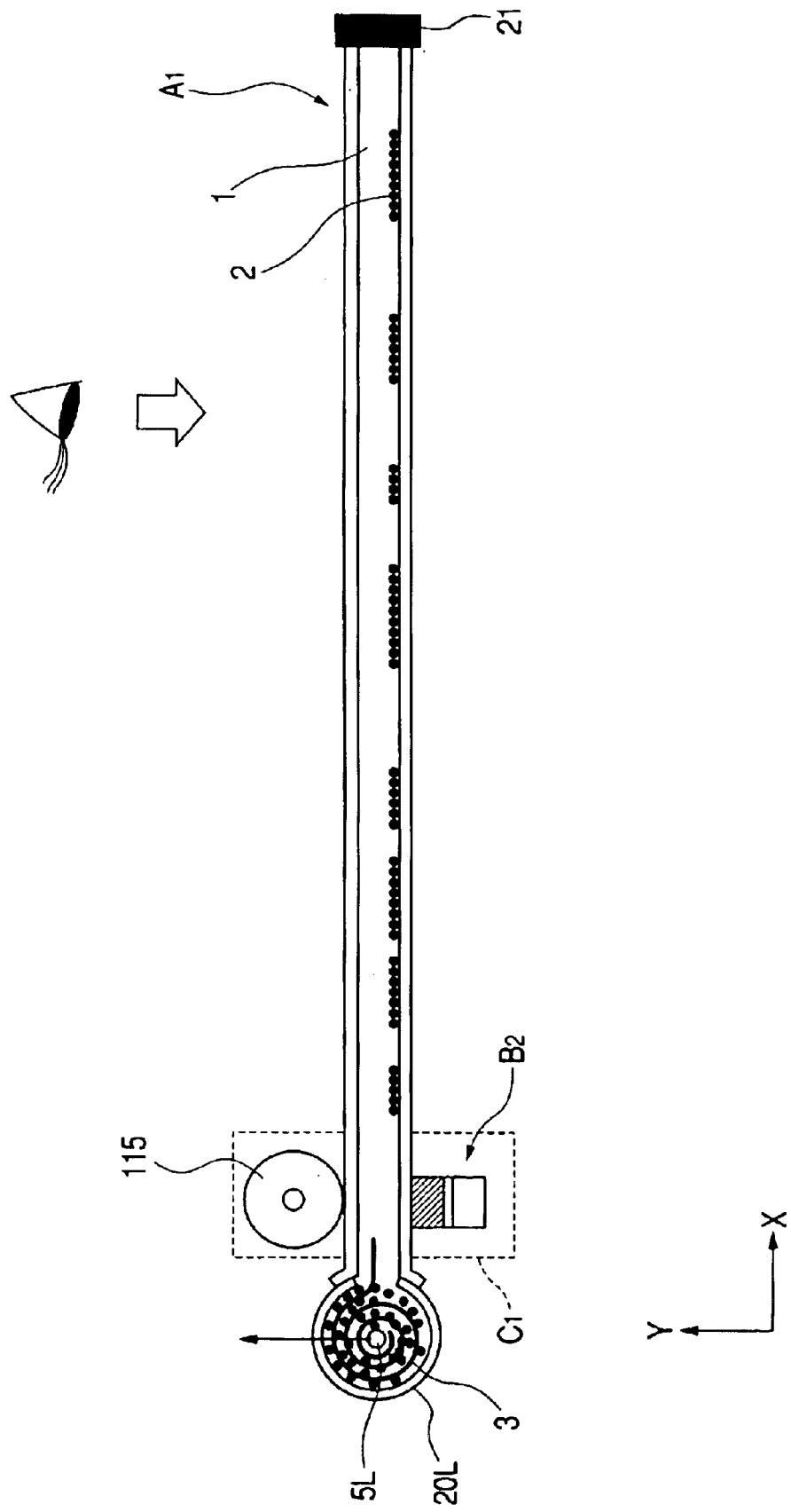
FIG. 8 is an explanatory view of a driving method of the display apparatus.
Figure 9:
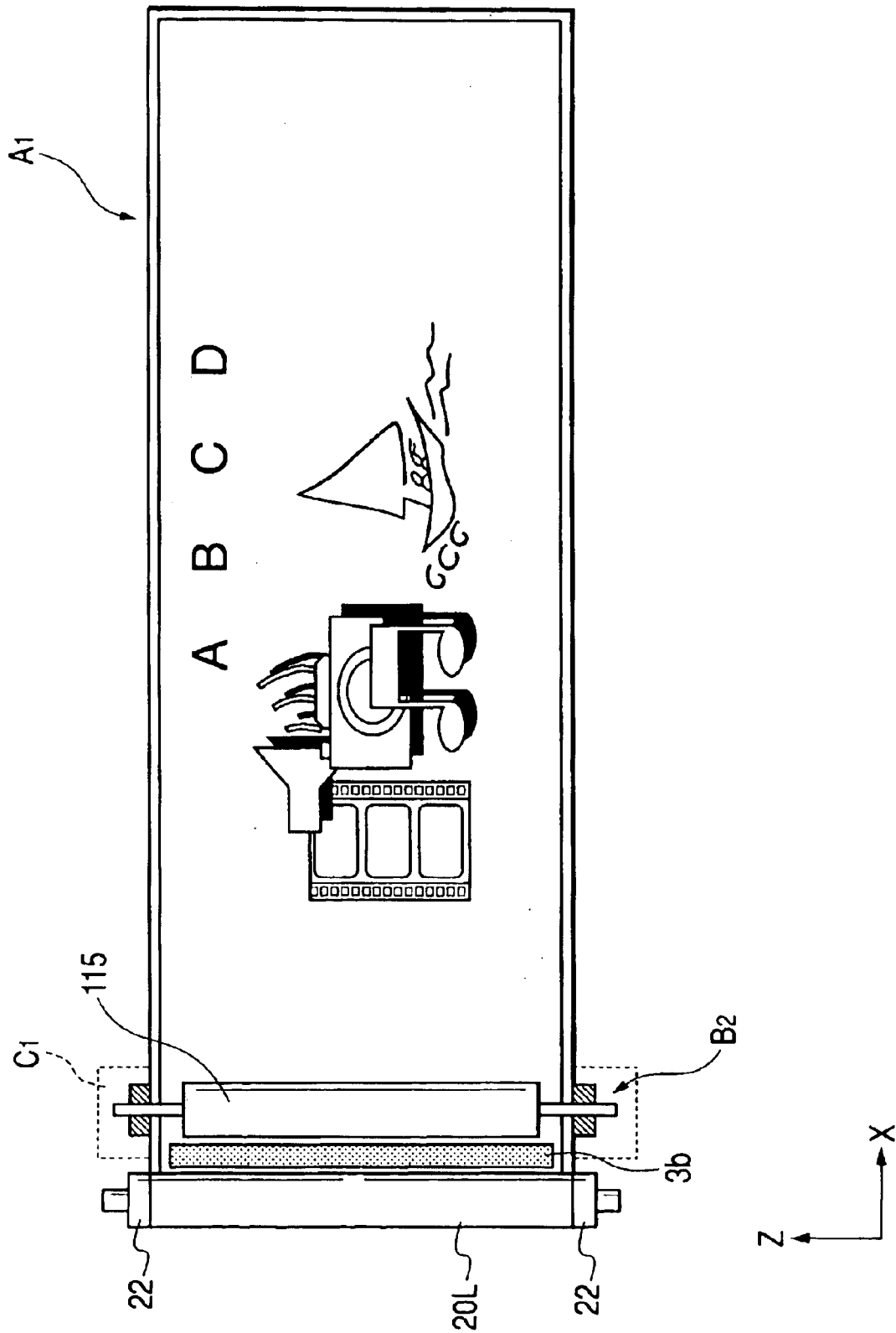
FIG. 9 is a plan view showing the structure of the display apparatus according to the present invention.

Moreover, the image display portion $A_1$ is constituted to be rich in flexibility. As shown in FIGS. 6 and 7, a second pressing member 115 is disposed to hold the image display portion $A_1$ with the photosensitive member 10. While the image is written by an image writing portion $B_2$, the second pressing member 115 is pressed onto the image display portion $A_1$, and a distance (distance shown by $D_2$ in FIG. 7) between the first electrode 3b and the substrate 4b may be held to be constant. Examples of the second pressing member 115 include a rotatably supported roller.

That is, the slide contact member 7 of FIG. 3A is disposed between the first electrode 3b and the substrate 4b, and thereby defines the distance $D_1$ so that the electrode and substrate are prevented from being brought close to each other. The spacer member 8 of FIG. 3A is disposed between the other substrate 4a and the first electrode 3b, and defines the distance $D_1$ so that a gap is prevented from being made between the slide contact member 7 and the substrate 4b. On the other hand, when the second pressing member 115 presses the image display portion $A_1$. onto the photosensitive member 10, the distance $D_2$ between the first electrode 3b and the substrate 4b is defined. The distance between the first electrode 3b and the substrate 4b may be defined by using one of the slide contact member 7, spacer member 8, and second pressing member 115 alone, or combining two or more thereof for use.

Figure 5:
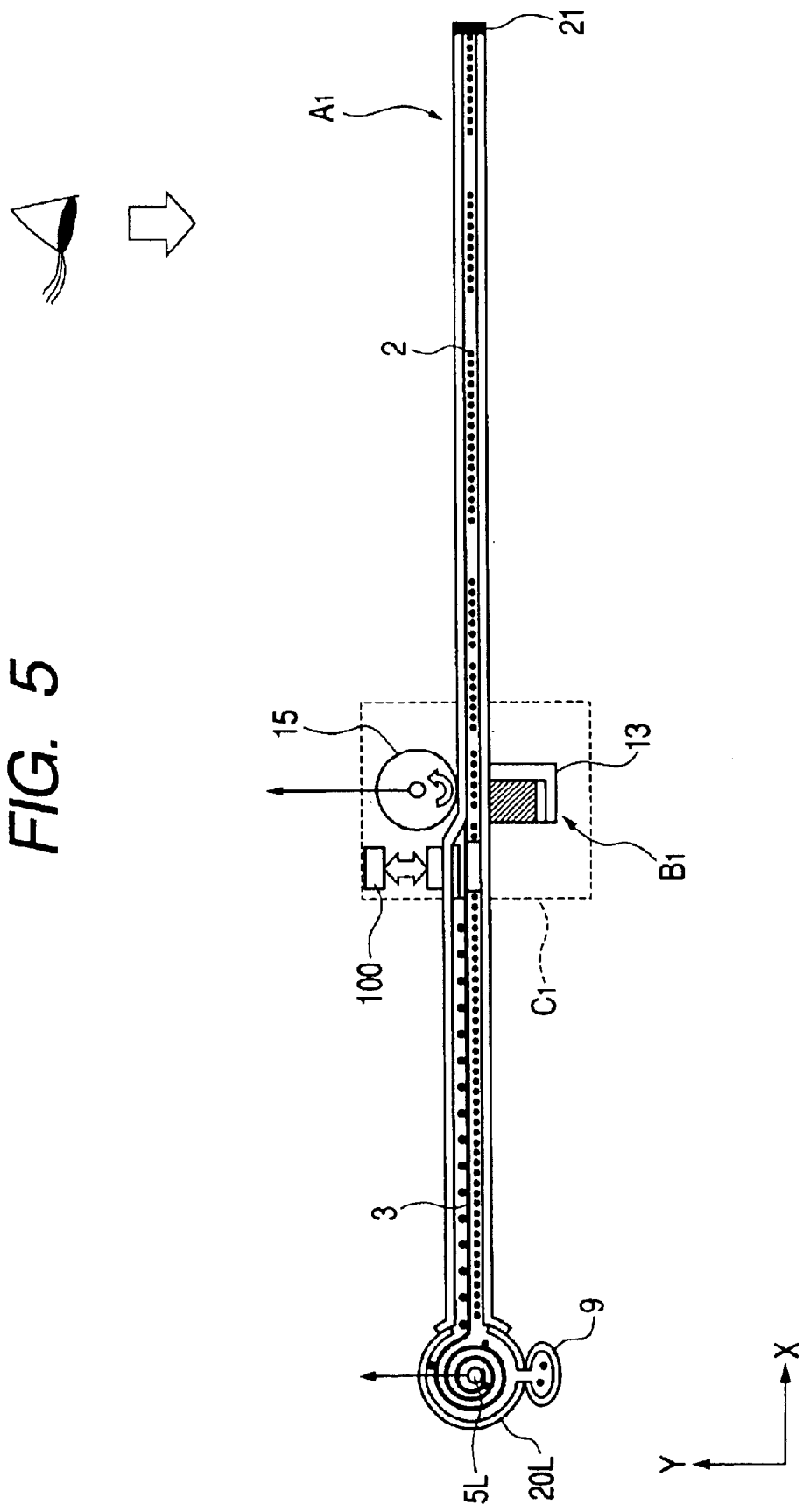
FIG. 5 is a sectional view showing another example of the structure of the display apparatus according to the present invention.

Furthermore, a magnetic toner is used in the coloring charged particles 2. Additionally, as shown in FIG. 5, a magnet 100 is disposed opposite to the image display portion $A_1$, and the magnet 100 may relatively be moved along the image display portion $A_1$ in order to promote cleaning (details will be described later) of the coloring charged particles 2. Concretely, the magnet 100 is set to be movable in a direction of ±Y, and is constituted to selectively take a position close to the image display portion $A_1$ or a position apart from the image display portion $A_1$. In the image writing process (details will be described later) the magnet is disposed in the position apart from the image display portion $A_1$, an influence of the magnetic force with respect to the coloring charged particles 2 is thereby reduced, and usual image writing is performed. In a cleaning process (details will be described later) the magnet is disposed in the vicinity of the image display portion $A_1$, and attracts the coloring charged particles 2 by the magnetic force so that the cleaning is promoted.

Figure 19:
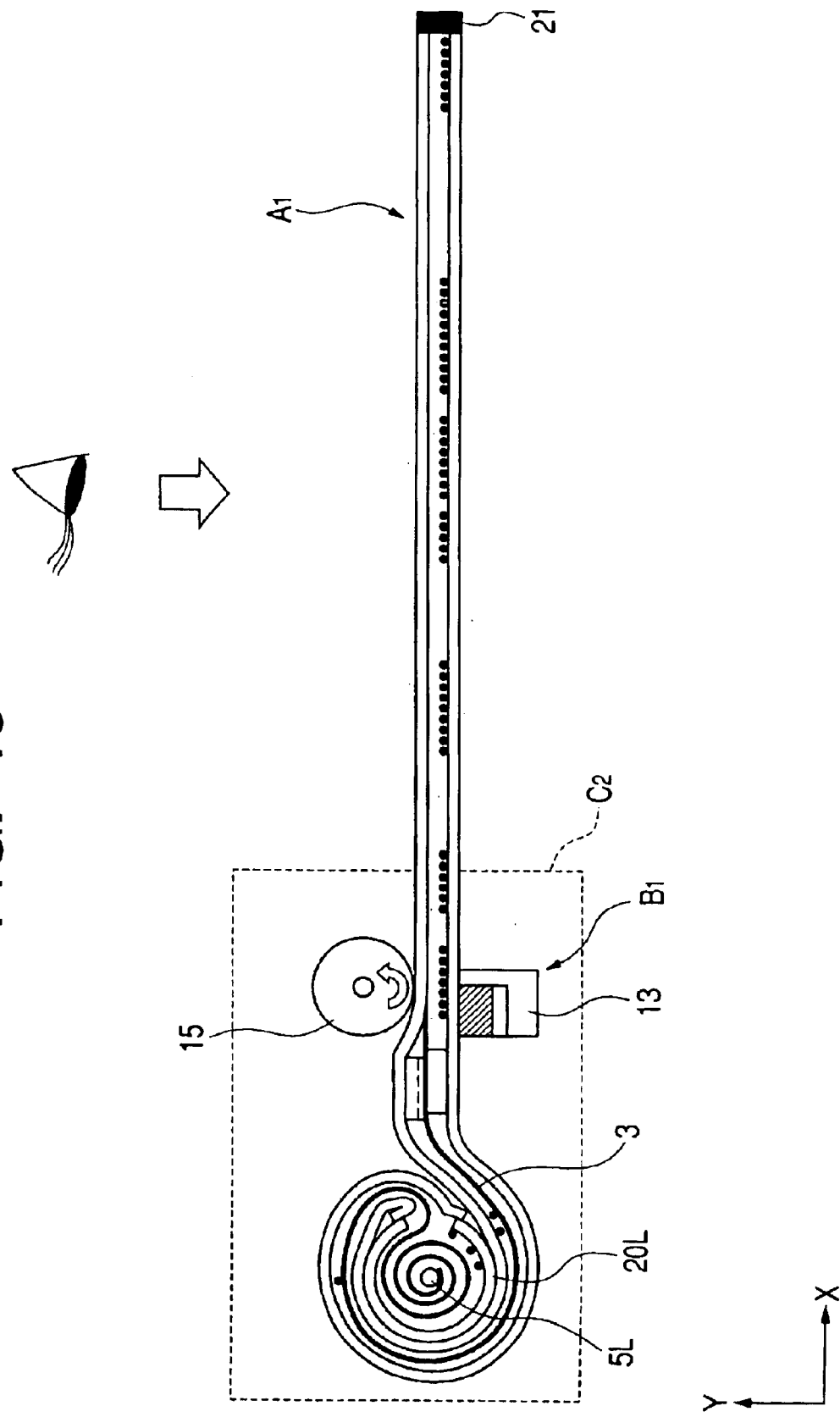
FIG. 19 is a sectional view showing another example of the structure of the display apparatus according to the present invention.
Figure 20:
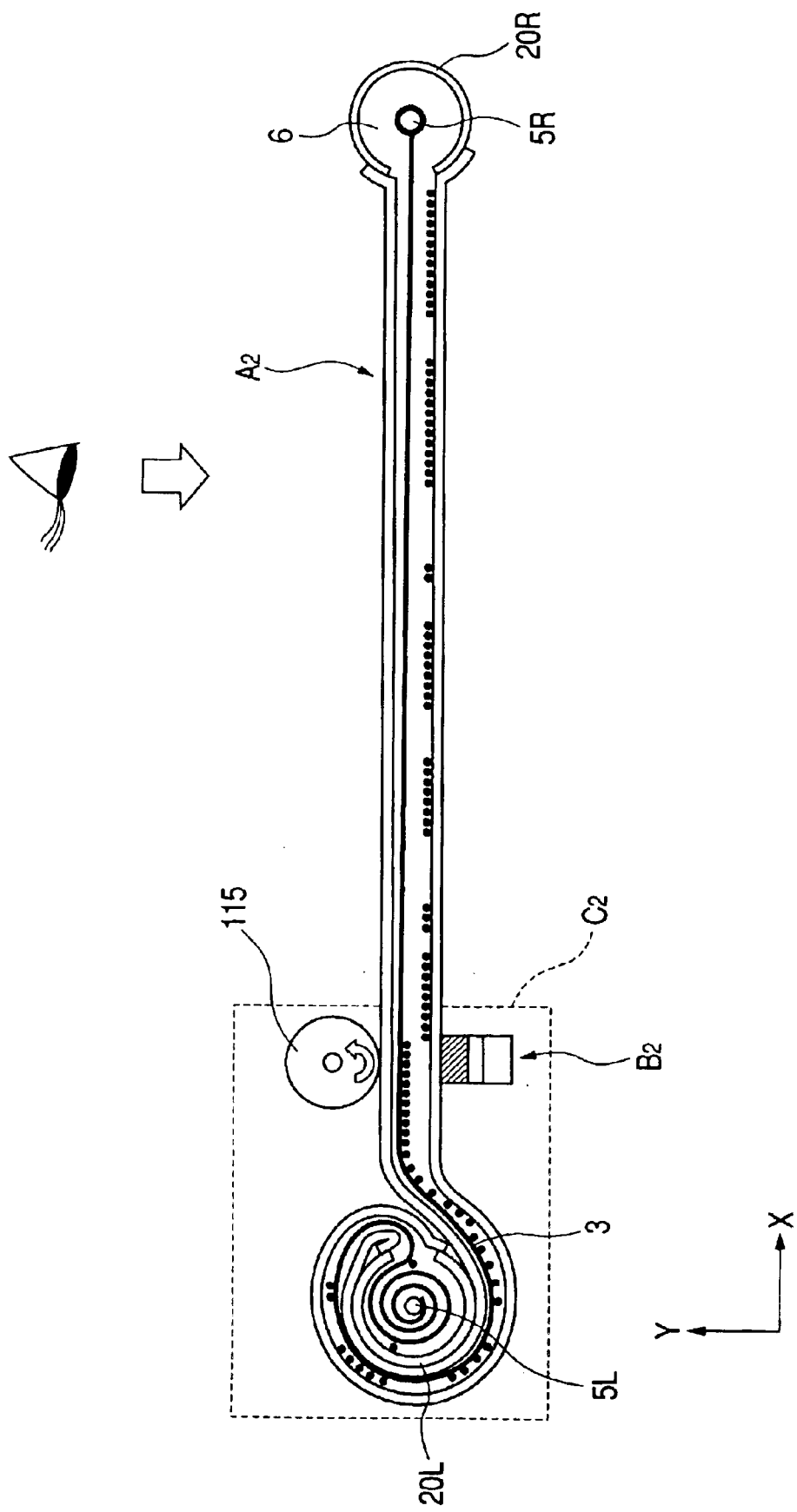
FIG. 20 is a sectional view showing another example of the structure of the display apparatus according to the present invention.
Figure 21A:
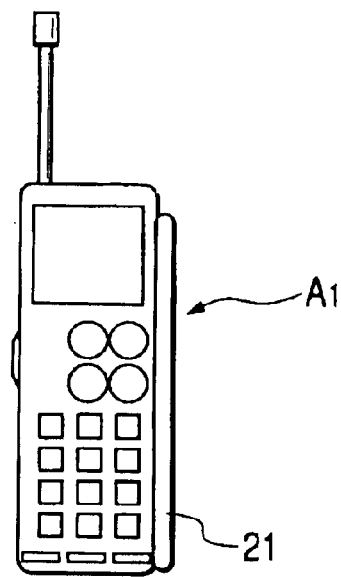
FIGS. 21A and 21B are diagrams showing an example in which the display apparatus is mounted on a mobile phone.
Figure 21B:
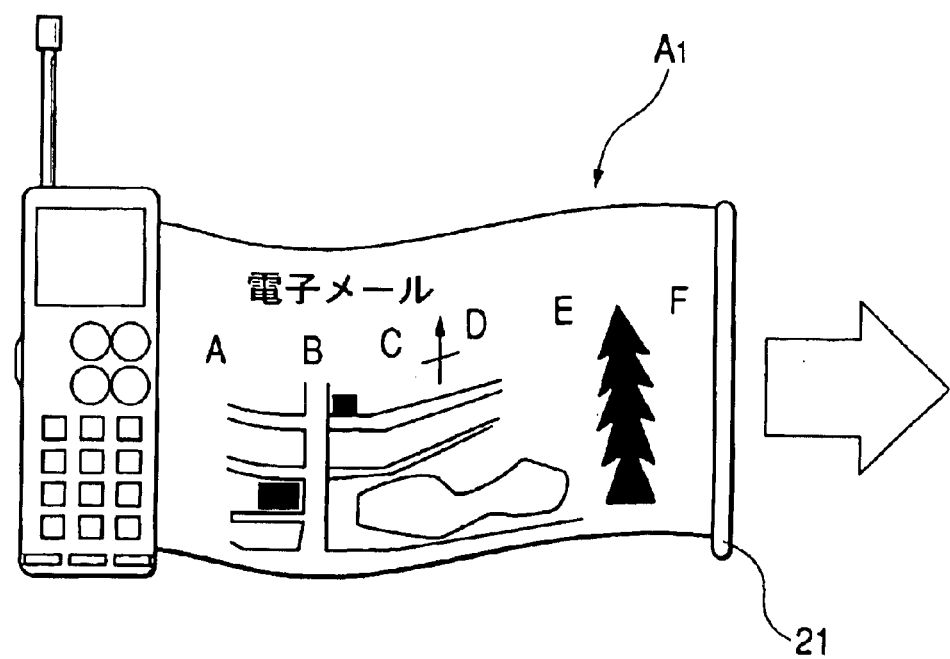
Figure 22A:
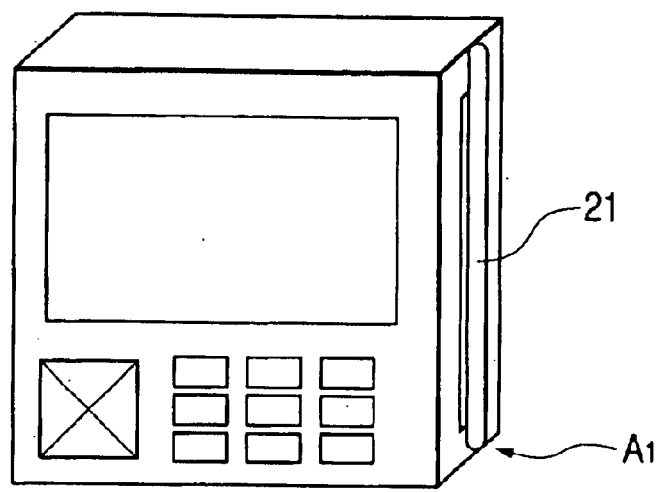
FIGS. 22A and 22B are diagrams showing an example in which the display apparatus is mounted on a car navigation apparatus.
Figure 22B:
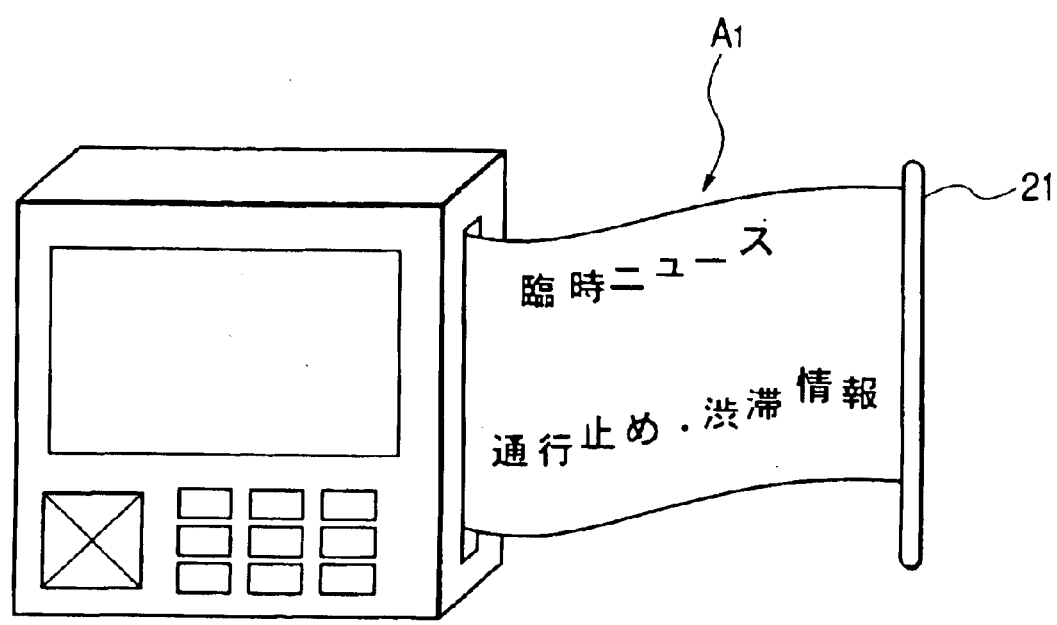

Additionally, when the image display portions $A_1$, $A_2$ are constituted to be rich in flexibility, as shown in FIGS. 19 and 20, at least one end of the portion may be wound. In FIGS. 19 and 20, the image display portions $A_1$, $A_2$ are wound around an outer peripheral surface of the cylindrical member 20L. However, even when the cylindrical member 20L is not disposed, a similar constitution can be achieved. In this case, winding/rewinding of the image display portion $A_1$ may be performed manually or automatically. In this constitution, the display apparatus according to the present invention can be compact, and can be mounted on various apparatuses. FIGS. 21A and 21B are diagrams showing an example in which the display apparatus is mounted on a mobile phone, FIG. 21A shows that the display apparatus $A_1$ is wound up and contained in the mobile phone, and FIG. 21B shows that the display apparatus $A_1$ is drawn out. When the display apparatus is mounted on the mobile phone, an electronic mail, and the like received by the mobile phone can be displayed in the display apparatus. On the other hand, FIGS. 22A and 22B are diagrams showing an example in which the display apparatus is mounted on a car navigation apparatus, FIG. 22A shows that the display apparatus $A_1$ is wound up and contained in the car navigation apparatus, and FIG. 22B shows that the display apparatus $A_1$ is drawn out. When the display apparatus is mounted on the car navigation apparatus, received traffic jam information, disaster information such as earthquake, heavy rain, and accumulation of snow, attached drawings, and the like can be displayed and confirmed in a broad screen. The display apparatus according to the present invention can be mounted on other mobile apparatuses.

Figure 24:
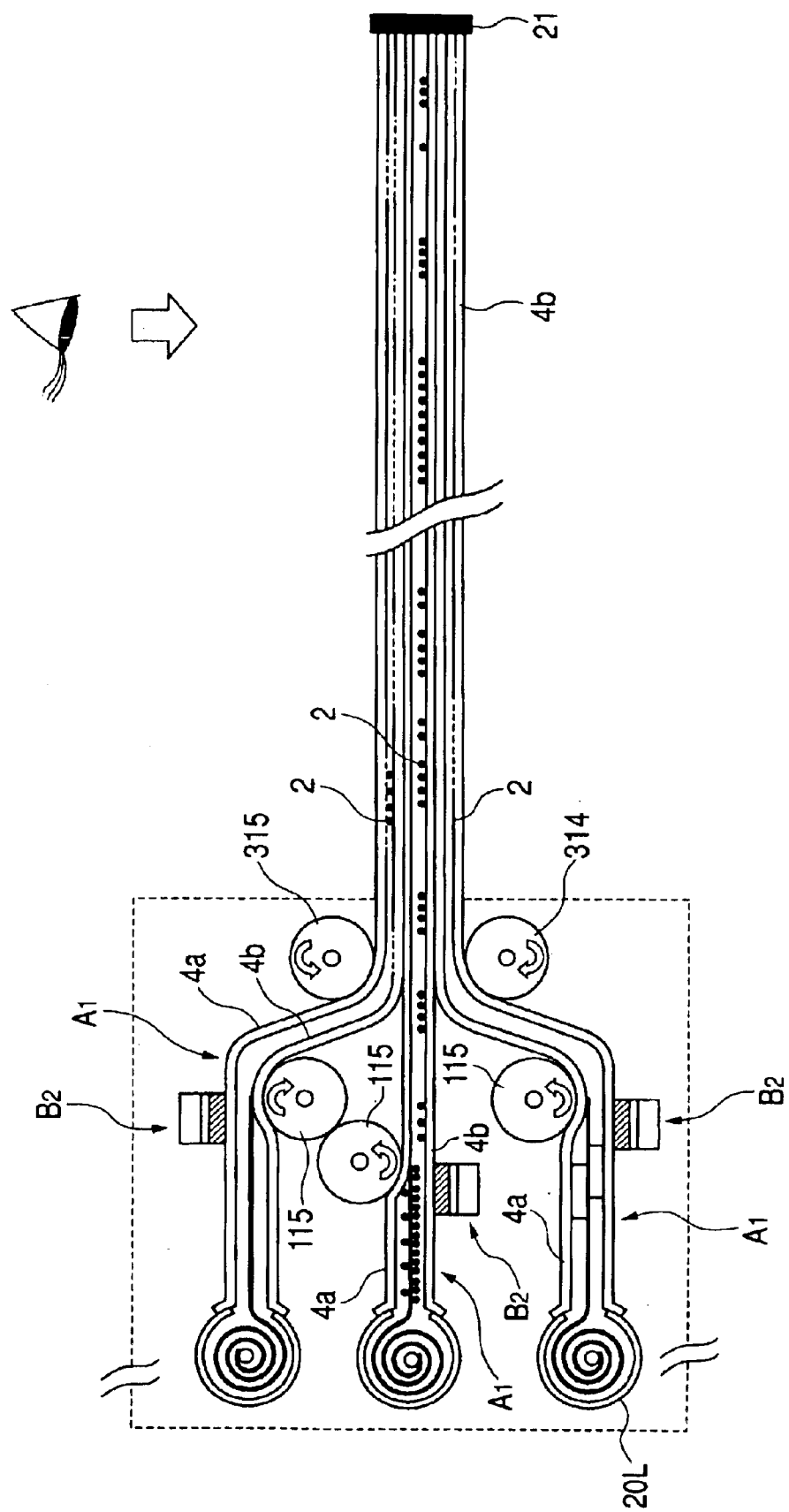
FIG. 24 is a sectional view showing one example of the structure of the display apparatus according to the present invention.
Figure 25:
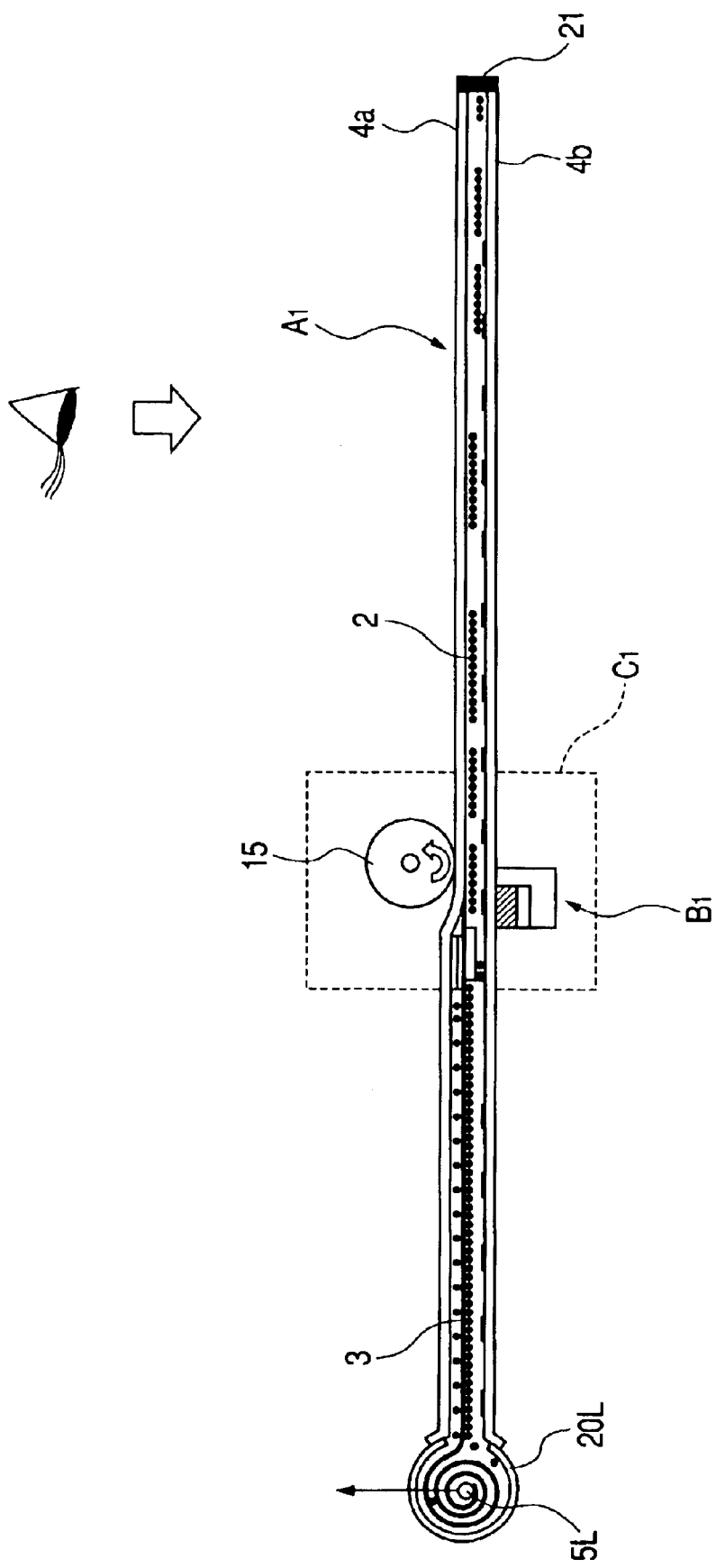
FIG. 25 is a sectional view showing one example of the structure of the display apparatus according to the present invention.
Figure 26:
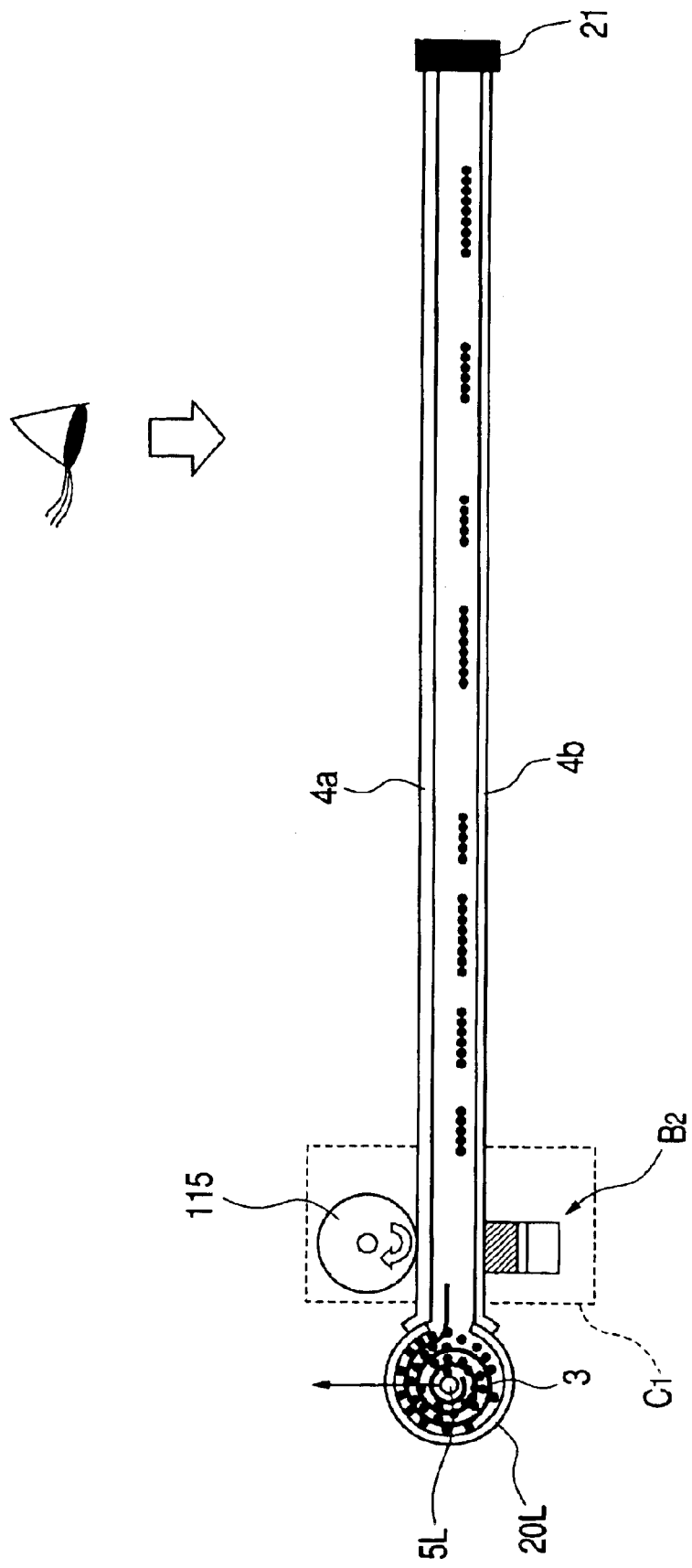
FIG. 26 is a sectional view showing one example of the structure of the display apparatus according to the present invention.

Additionally, the display apparatus according to the present invention may be used to perform color display. For this, as shown in FIGS. 23 and 24, a color display method of disposing three image display portions $A_1$, and three image writing portions $B_1$ (or $B_2$), displaying a different color image in each image display portion $A_1$, and superposing these image display portions $A_1$ upon one another may be used. Alternatively, as shown in FIGS. 25 and 26, a color display method of disposing one image display portion $A_1$ and one image writing portion $B_1$ (or $B_2$), setting the coloring charged particles 2 of the image display portion $A_1$ to be black, and disposing a color filter on the substrate 4b may be used.

A method for driving the display apparatus will next be described.

In order to write a new image in the display apparatus according to the present embodiment, first the cleaning process is performed to delete an old image, and the image writing process is performed to control the positions of the coloring charged particles 2.

For example, the cleaning process may comprise applying a voltage having a polarity different from a charged polarity of the coloring charged particles 2 to the first electrode 3b, and attracting the micro particles 2 sticking to the substrate 4b. Moreover, the cleaning process may comprise disposing the slide contact member 7 in the movable member 3 as described above, and physically stripping the coloring charged particles 2 by the slide contact member 7.

On the other hand, when the image writing portion $B_1$ is constituted by the photosensitive member 10, second electrode 11, and light source 12, the image writing process may comprise moving the image writing portion $B_1$ along the image display portion $A_1$ and allowing the light source 12 to blink.

Figure 31:
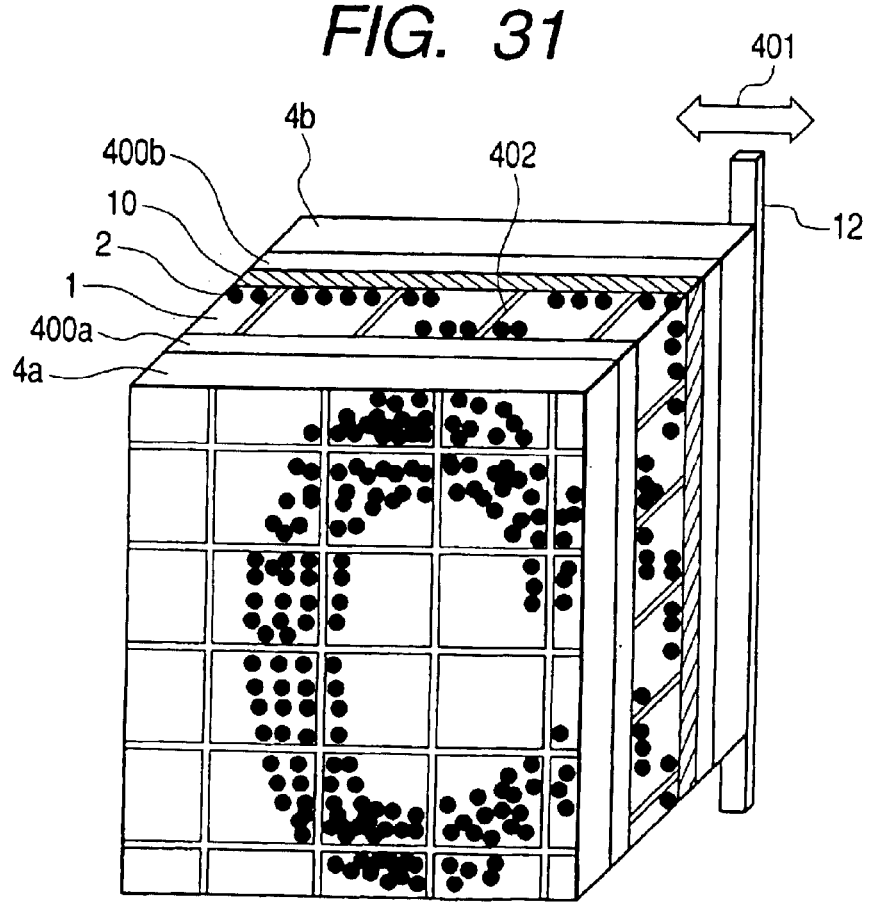
FIG. 31 is an explanatory view of a structure of a conventional electrophoresis display apparatus.

According to the present embodiment, the movable electrode sheet is inserted into the substrate gap, the electric field is applied between the sheet and the writing unit disposed outside the image display portion, and the positions of the charged particles are thereby controlled. Therefore, it is sufficient that the insulating liquid 1 and coloring charged particles 2 be disposed in the image display portion $A_1$. It is unnecessary to form the electrode on the substrate as shown by the apparatus of FIG. 31. Therefore, transparency is not deteriorated by the substrate, and bright display can be achieved.

Moreover, the insulating liquid 1 can be agitated by the movement of the substrate sheet. Additionally, the cleaning for stripping the charged particles from the substrate surface can also be performed. Therefore, mutual adhesion and sedimentation of the micro particles can be avoided, and display quality can be kept to be satisfactory.

Furthermore, for a portion in which the image writing is ended, the pair of first pressing members 13, 15 (or 214, 215) with the image display portion $A_1$ or $A_2$ held therebetween are moved along the substrates 4a, 4b, and the insulating liquid 1 and coloring charged particles 2 are successively pushed out of the sealed gap. In this case, the substrates adhere to each other via remaining charged particles, and therefore a displayed image can steadily be held for a long time. Furthermore, the substrate gap does not have to be kept by the spacer, manufacturing of the display apparatus is simplified, and material and manufacturing costs can be reduced.

The present invention will be described hereinafter in terms of examples in more detail.

EXAMPLE 1

In the present example, the display apparatus shown in FIGS. 1, 2, 3A, 3B and 4 was prepared.

That is, two sheets 4a, 4b of polyethylene terephthalate (PET) rich in insulating property and flexibility were disposed opposite to each other, and edges of the sheets were sealed by an end seal 21. Additionally, one PET 4a was transparent, and the other PET 4b was white. Moreover, in one end of the PET 4a, 4b, the cylindrical member 20L of aluminum was disposed and connected to the substrate gap, opposite ends of the member was closed by oil seals 22 (see FIG. 4), and the sealed gap was formed.

Subsequently, the sealed gap was filled with isoparaffin (trade name; Isoper) 1 as the transparent insulating liquid, 0.01 wt % of OLOA-1200 (Shebron Oronite Co.) was added as the charging control agent, and further a toner (coloring charged particles) 2 having a particle diameter of 2 $\mu$m) was added. The toner 2 was prepared by dispersing 10 wt % of carbon black (Tokai Carbon Kabushiki Kaisha) in copolymer of acrylic styrene, and performing kneading, grinding, and classification, and indicated a negative polarity by the charging control agent.

Moreover, the movable member 3 was disposed in the substrate gap. The movable member 3 in the present example is a flexible electrode sheet comprised of the 100 $\mu$m thick PET sheet 3a which is insulating and rich in flexibility, and the aluminum electrode (first electrode) 3b which is deposited on the lower surface (i.e., surface disposed opposite to the white PET 4b) of the sheet 3a. Furthermore, in the vicinity of the tip end of the PET sheet 3a, as shown in FIG. 3A in detail, the lower block (slide contact member) 7 was attached to the surface with the aluminum electrode 3b formed thereon, and the upper block (spacer member) 8 was attached to the upper surface. For the blocks, the size of the upper block 8 was set so that the upper surface of the block contacted the transparent PET 4a, and the through hole 8a was formed in a direction of x in the drawing. Moreover, the size of the lower block 7 was set (20 $\mu$m thick) so that the lower surface of the block contacted the white PET 4b, and the through hole 7a was formed in the direction of x in the drawing.

On the other hand, the first wind-up shaft 5L was disposed in the cylindrical member 20L, and the movable member 3 was wound around the wind-up shaft 5L. The wind-up shaft 5L was rotated, the movable member 3 was thereby moved along the PET 4a, 4b (i.e., direction of ±X in the drawing), with the movement the lower block 7 scraped the toner 2 sticking to the white PET 4b, and the toner 2 floating in the insulating liquid and passed through the through holes 7a, 8a was agitated. Moreover, the voltage was applied to the aluminum electrode 3b via the wind-up shaft 5L (details will be described alter). Furthermore, the liquid pressure adjustment chamber 9 was attached to the cylindrical member 20L.

The image display portion $A_1$ in the present example was constituted as described above, and the developing head (image writing portion) $B_1$ was disposed not to overlap the lower block 7 in the position opposite to the tip end of the movable member 3. As shown in FIG. 3A, the developing head $B_1$ was constituted of the OPC (photosensitive member) 10 disposed in the position opposite to the white PET 4b, transparent conductive film (second electrode) 11 disposed on the back surface of the OPC 10, and LED 12, disposed on the back surface of the transparent conductive film 11, for irradiating the OPC 10 with light. In the constitution, the OPC 10 was formed in a thickness of 100 $\mu$m by a charge generation layer 10a and charge transport layer 10b as shown in FIGS. 27A, 27B, 27C and 27D, and the transparent conductive film 11 was formed by ITO, earthed, and set to a potential of GND level. Additionally, the OPC 10, transparent conductive film 11, and LED 12 were supported by the support member (first pressing member) 13, and the support member 13 was disposed along the white PET 4b in the direction of +X and shaped so as to be brought in slide contact with the lower surface of the PET 4b as shown in FIG. 2. Moreover, the case (housing) $C_1$ was disposed to enclose the developing head $B_1$, so that the OPC 10 was prevented from being irradiated with lights other than the light of LED 12. Furthermore, the developing head $B_1$ was constituted to be movable in the direction of ±Y in order to selectively take the position contacting the white PET 4b and the position apart from the white PET 4b.

Moving of charges is illustrated in detail by FIGS. 27A, 27B, 27C and 27D in the following.

Figure 27A:
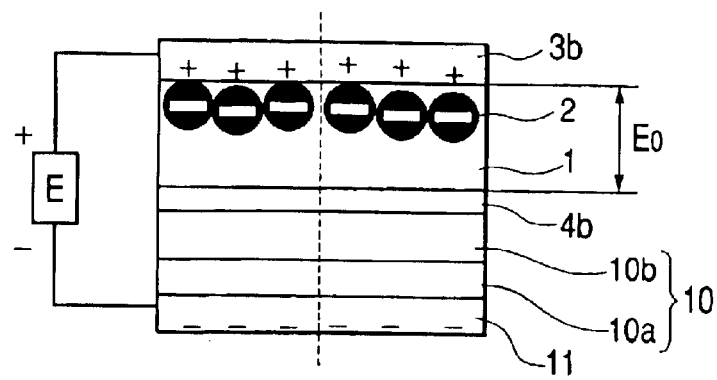
FIGS. 27A, 27B, 27C and 27D are schematic views showing states of movement of coloring charged particles.

FIG. 27A shows the cleaning step. A bias of +200 V, which has an opposite polarity to that of toner 2, is applied to an opposite electrode portion 3b so that electric field $E_0$ at the developing gap increases, whereby negatively-charged toners 2 are attracted to opposite electrode portion 3b.

Figure 27B:
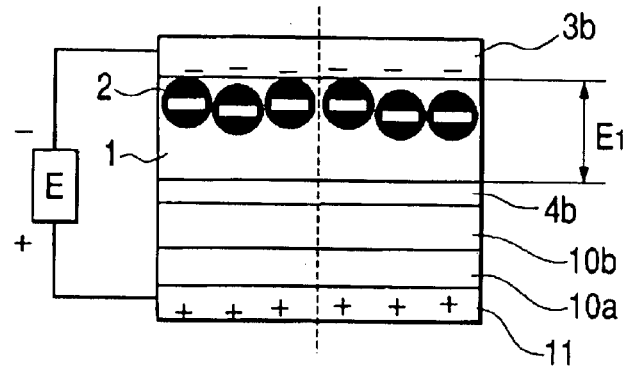

FIG. 27B shows the developing step. The bias is changed into −100 V in the step. Electric field strength $E_1$ according to the bias does not enable toner 2 to transfer.

Figure 27C:
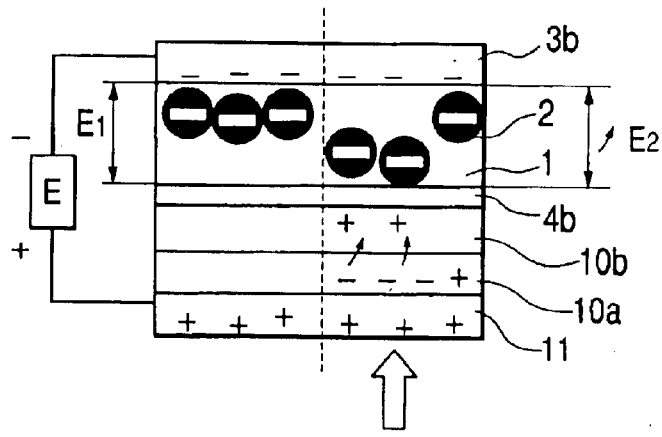

FIG. 27C shows the exposing step. In the step, carriers are generated in exposed charge generation (CG) layer 10a and transfer toward white PET 4b through charge transport layer 10b. As a result, electric field strength $E_2$ at the developing gap in the exposed portion amounts to 1.15 V/$\mu$m, which is greater than 1 V/$\mu$m, which is a criterion used for recognition of start of the transferring (such a criterion value depends on a viscosity of insulating liquid 1, a weight or diameter of toner 2, and so forth). Toners 2 existing at the exposed portion therefore start on the transferring toward white PET 4b. On the other hand, toners 2 existing at the non-exposed portion do not transfer because electric field strength $E_1$ at the developing gap in the non-exposed portion is 0.65 V/$\mu$m, which is smaller than the criterion, 1 V/$\mu$m.

Figure 27D:
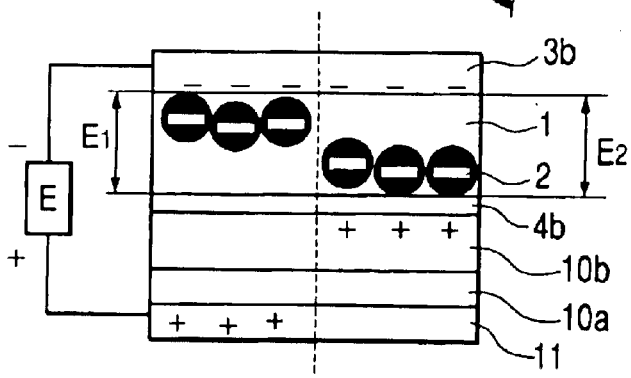

FIG. 27D shows states of toners 2 after development, wherein a developed image can be observed from a position of the eye mark in the figure after removing toners 2 at the side of opposite electrode portion 3b.

On the other hand, the squeeze roller (first pressing member) 15 was disposed on the image display portion $A_1$ and opposite to the support member 13. That is, in the present example, the support member 13 and the squeeze roller 15 are disposed to sandwich the image display portion $A_1$. The squeeze roller 15 was set to be movable in the direction of ±Y, and selectively took the position contacting the transparent PET 4a and the position apart from the PET 4a. Moreover, the squeeze roller 15 was rotated in a counterclockwise direction by driving means (not shown).

A driving method of the display apparatus in the present example will next be described.

In the present example, the cleaning process was performed to delete the old image, and the image writing process was performed to write the new image. The respective processes will be described hereinafter.

<Cleaning Process>

The present process is performed while the old image is displayed. In this state, the toner 2 adheres to the white PET 4b.

To perform the present process, the squeeze roller 15 is moved upwards (±Y direction) until the roller is detached from the transparent PET 4a. The developing head $B_1$ is moved downwards (−Y direction) until the head is detached from the white PET 4b. In this state, the squeeze roller 15 and developing head $B_1$ are moved to the vicinity of the end seal 21 in the direction of +X. In this case, the movable member 3 is also moved together with the squeeze roller 15 and developing head $B_1$ in the direction of +X, and a cleaning bias of +200 V is applied to the aluminum electrode 3b via the wind-up shaft 5L. By the application of the cleaning bias, an electric field (hereinafter referred to as "developing gap field") $E_0$ between the aluminum electrode 3b and the white PET 4b (see FIG. 28) increases, and the negative-polarity toner 2 sticking to the white PET 4b is stripped from the white PET 4b and attached to the aluminum electrode 3b as shown in FIG. 27A. When the movable member 3 is moved, the lower block 7 is brought into slide contact with the white PET 4b, but the toner 2 sticking to the white PET 4b is physically stripped also by the block 7.

<Image Writing Process>

The image writing process will next be described.

To perform the present process, the squeeze roller 15 is moved downwards (−Y direction) until the roller contacts the transparent PET 4a, and the developing head $B_1$ is moved upwards (+Y direction) until the head contacts the white PET 4b. In this state, the wind-up shaft 5L is rotated to wind up the movable member 3 in the −X direction. Additionally, the squeeze roller 15 is rotated in the counterclockwise direction, and the roller 15 and developing head $B_1$ are moved in the −X direction to the vicinity of the cylindrical member 20L.

Figure 28:
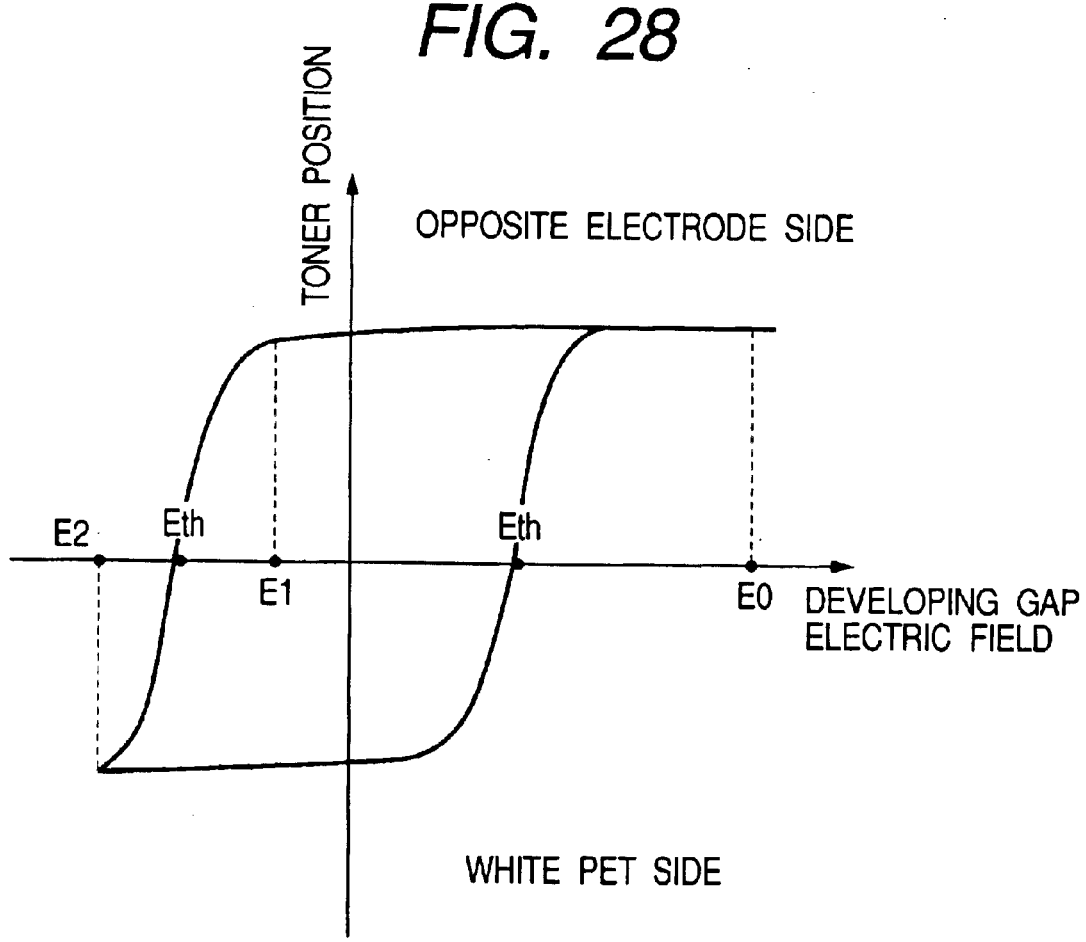
FIG. 28 is a diagram showing a relation between a developing gap electric field and a toner position.
Figure 29:
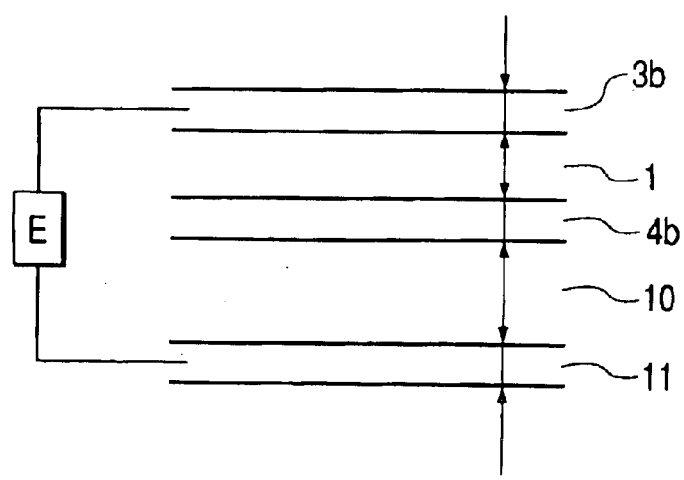
FIG. 29 is an explanatory view of application of a developing bias.

In this case, a developing bias of −100 V is applied to the aluminum electrode 3b via the wind-up shaft 5L (see $E_1$ of FIG. 28, and FIG. 29).

A mechanism of the development is illustrated by the figures in the following.

FIG. 29 shows layers to which developing bias E is applied. Developing bias E is applied between aluminum-deposited face 3b of the electrode sheet and ITO 11, which is a transparent electrode of OPC 10. Transparent liquid 1 containing toners 2, which corresponds to the developing gap, white PET 4b and OPC 10 are located between the electrodes in this order.

Figure 30A:
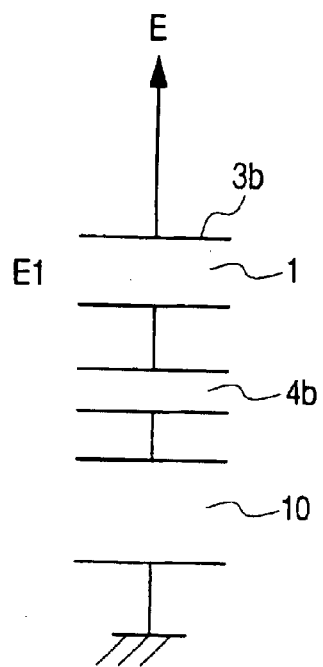
FIGS. 30A and 30B are explanatory views of states of developing.
Figure 30B:
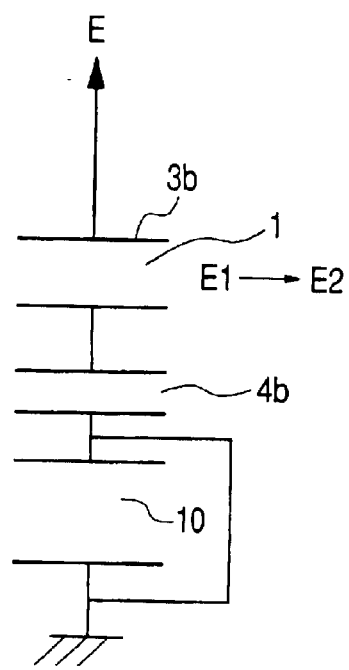

FIGS. 30A and 30B show an equivalent circuit of exposed portions and non-exposed portions. Developing biases E applied to an exposed portion and a non-exposed portion are constant. As a result, an electric field strength of the developing gap increases from $E_1$ to $E_2$ in value by the same as a capacitance as a result of the shorting of the capacitor of OPC 10. In this case, the polarity of the bias has been set so as to make toner 2 part from opposite electrode portion 3b so that toners 2 at the exposed portion transfer to white PET 4b.

When the developing bias is simply applied to the aluminum electrode 3b, an electric field strength $E_1$ between the aluminum electrode 3b and the white PET 4b is of the order of 0.65 V/$\mu$m and is smaller than a movement start electric field strength $E_{th}$=1V/$\mu$m (see FIG. 28). Therefore, the toner 2 still sticks to the aluminum electrode 3b without moving. However, the LED of the developing head $B_1$ repeats blinking in a process of movement in the −X direction (in accordance with given image information). In a portion in which the LED 12 passes without being lit, the electric field strength $E_1$ between the aluminum electrode 3b and the white PET 4b does not change, and the toner 2 still sticks to the aluminum electrode 3b as described above (see FIG. 27B). However, in a portion in which the LED 12 is lit, a carrier is generated in the charge generation layer (CG) 10a of the OPC 10, and the carrier passes through the charge transport layer (CT) 10b and moves toward the white PET 4b. Therefore, opposite-ends voltages of the OPC 10 drop (see FIG. 30B), and the electric field strength between the aluminum electrode 3b and the white PET 4b increases by the drop ($E_2$=1.15 V/$\mu$m) and becomes larger than the movement start electric field strength $E_{th}$=1 V/$\mu$m (see FIG. 28). The toner 2 moves onto the white PET 4b, and attached by Van der Waals force (see FIGS. 27C and 27D).

Additionally, as shown in FIG. 2, the image display portion $A_1$ in a portion in which the image is formed is squeezed by the squeeze roller 15 and support member 13.

Therefore, the isoparaffin 1 and toner 2 (toner 2 still floating in isoparaffin) are pushed in the shown −X direction, passed through the through holes 7a, 8a, moved toward the cylindrical member 20L, and accumulated in the liquid pressure adjustment chamber 9. Additionally, the voltage (squeeze bias) having the same polarity as that of the toner 2 is applied to the squeeze roller 15 to such an extent that the toner 2 is not agitated, and the toner 2 can therefore smoothly be moved.

Figure 4:
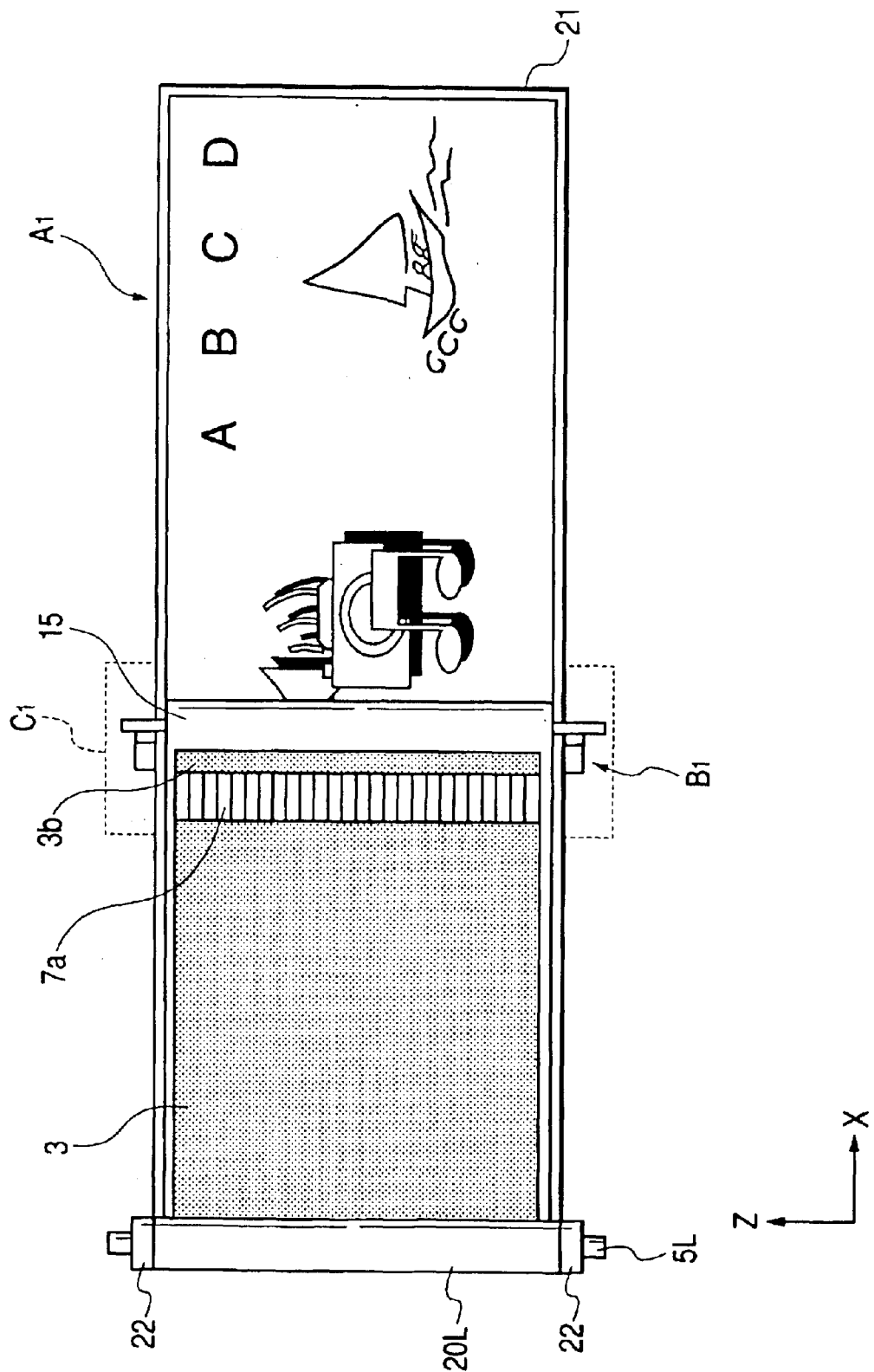
FIG. 4 is a plan view showing the structure of the display apparatus according to the present invention.

The image writing is performed with the movement of the movable member 3, and the like. As a result, the image is displayed in the white PET 4b as shown in FIG. 4. Moreover, the image writing process ends, when the squeeze roller 15 and developing head B$_1$ moved to a left end of the image display portion A$_1$. The squeeze roller 15 and developing head B$_1$ are stopped in the vicinity of the cylindrical member 20L, and the application of the developing bias to the aluminum electrode 3b is also stopped. Additionally, the squeeze roller 15 and developing head B$_1$ are held in a contact state with the image display portion A$_1$.

According to the present example, an effect similar to the effect described in the embodiment of the present invention was obtained.

EXAMPLE 2

In the present example, the display apparatus shown in FIG. 5 was prepared. That is, a magnetic toner is used as the toner 2, and the magnet 100 attachable/detachable with respect to the transparent PET 4a is disposed on the left side of the squeeze roller 15. In the image writing process the magnet 100 is disposed in the position apart from the transparent PET 4a so that no influence is exerted. However, in the cleaning process, the magnet 100 is brought to the vicinity of the transparent PET 4a to help the toner 2 to be stripped from the white PET 4b. Other constitutions and driving method were set to be the same as those of Example 1.

According to the present example, the cleaning process is performed so that the toner 2 can be removed from the white PET 4b.

EXAMPLE 3

In the present example, the display apparatus shown in FIGS. 6, 7, 8 and 9 was prepared. That is, in the present example, the lower block 7, upper block 8, and squeeze roller 15 used in Example 1 were not used. As shown in FIGS. 6 and 7, the pressure roller (second pressing member) 115 was disposed to hold the image display portion A$_1$ with the OPC (photosensitive member) 10. Moreover, while the developing head (image writing portion) B$_2$ performed the image writing, the pressure roller 115 was pressed onto the image display portion A$_1$, and the distance D$_2$ between the aluminum electrode 3b and the white PET 4b was held to be constant. Other constitutions was set to be similar to those of Example 1.

The driving method of the display apparatus in the present example will next be described.

<Cleaning Process>

To perform the present process, the pressure roller 115 is moved upwards (±Y direction) until the roller is detached from the transparent PET 4a. The developing head B$_2$ is moved downwards (−Y direction) until the head is detached from the white PET 4b. While the cleaning bias is not applied, the movable member 3 is moved in the +X direction until the tip end of the member abuts on the end seal 21. Thereafter, either a method of applying the cleaning bias to the aluminum electrode 3b, or a method of moving the movable member 3 (exactly the aluminum electrode 3b) with the cleaning bias applied thereto in the +X direction until the tip end of the member abuts on the end seal 21 similarly as Example 1 is performed. Thereby, the negative-polarity toner 2 sticking to the white PET 4b is stripped from the white PET 4b and adsorbed in the aluminum electrode 3b. Additionally, the pressure roller 115 and developing head B$_2$ are also moved together with the aluminum electrode 3b in the +X direction to the vicinity of the end seal 21.

<Image Writing Process>

To perform the present process, the pressure roller 115 is moved downwards (−Y direction) until the roller contacts the transparent PET 4a, and the developing head B$_2$ is moved upwards (+Y direction) until the head contacts the white PET 4b. In this state, the pressure roller 115 is rotated in the counterclockwise direction, and the pressure roller 115 and developing head B$_2$ are moved in the −X direction to the vicinity of the cylindrical member 20L (see FIGS. 6 and 7). In this case, since the pressure roller 115 presses the image display portion A$_1$ onto the OPC 10, the distance D$_2$ between the aluminum electrode 3b on the flexible sheet 3 and the white PET 4b is held to be constant. In this state, similarly as Example 1, the developing bias is applied to the aluminum electrode 3b via the wind-up shaft 5L, and the LED 12 of the developing head B$_2$ repeats blinking (in accordance with the given image information) so that the image is formed (see FIG. 9).

Subsequently, the roller 115 and developing head B$_2$ reach the vicinity of the cylindrical member 20L, and are then stopped in the position apart from the PET 4a, 4b.

Additionally, while the roller 115 and developing head B$_2$ are moved, the movable member 3 remains to be stopped different from Example 1. After the end of the movement of the roller 115 and developing head B$_2$, the member is taken up by the wind-up shaft 5L (see FIG. 8).

According to the present example, only a minimum required amount (i.e., the amount by which a sufficient density can be obtained with black display in the whole image display portion) of toner 2 is added. Additionally, after the end of the image writing process, most of the toner sticks to the aluminum electrode 3b or the white PET 4b, and considerably little toner 2 floats in the isoparaffin 1. Therefore, even when the isoparaffin 1 remains between the PET 4a, 4b after the end of the image writing process, the image has a high contrast and good quality.

Moreover, since the distance D$_2$ between the aluminum electrode 3b and the white PET 4b is held to be constant in the image writing process, the image quality becomes satisfactory.

EXAMPLE 4

Figure 11:
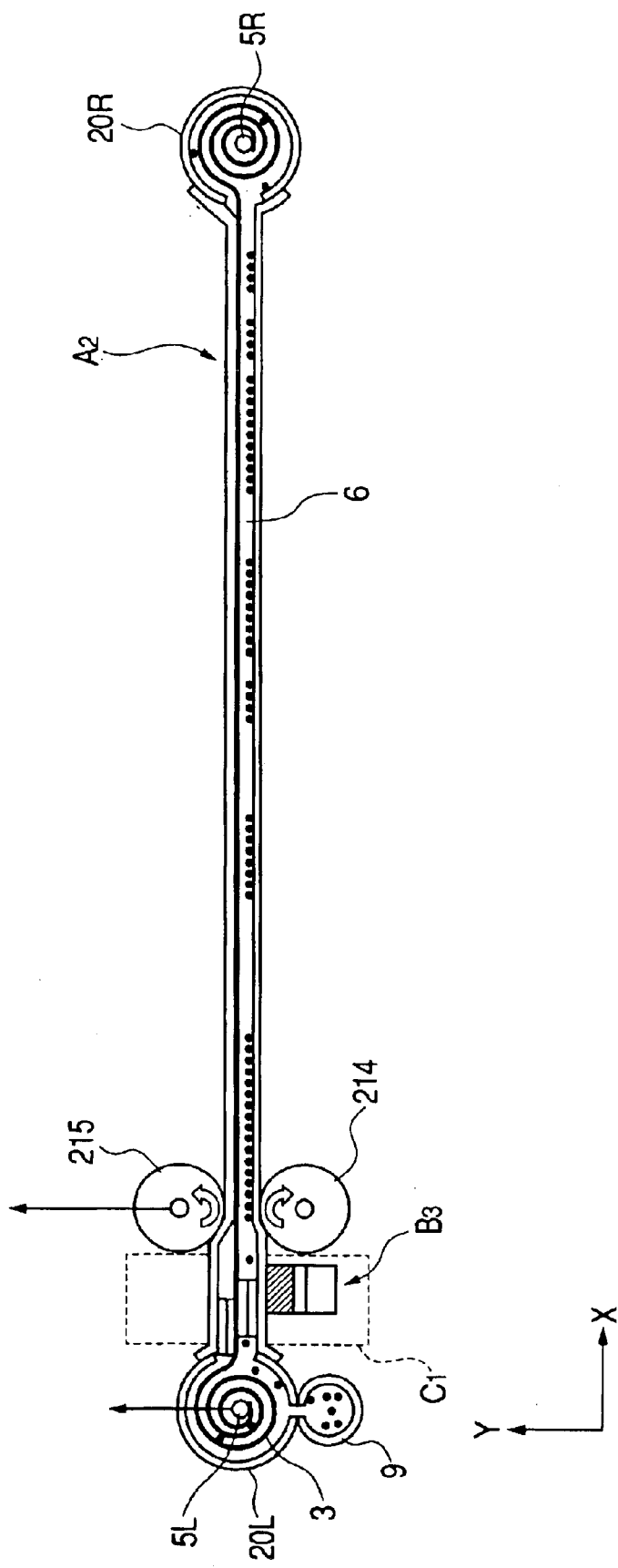
FIG. 11 is an explanatory view of a driving method of the display apparatus.
Figure 12:
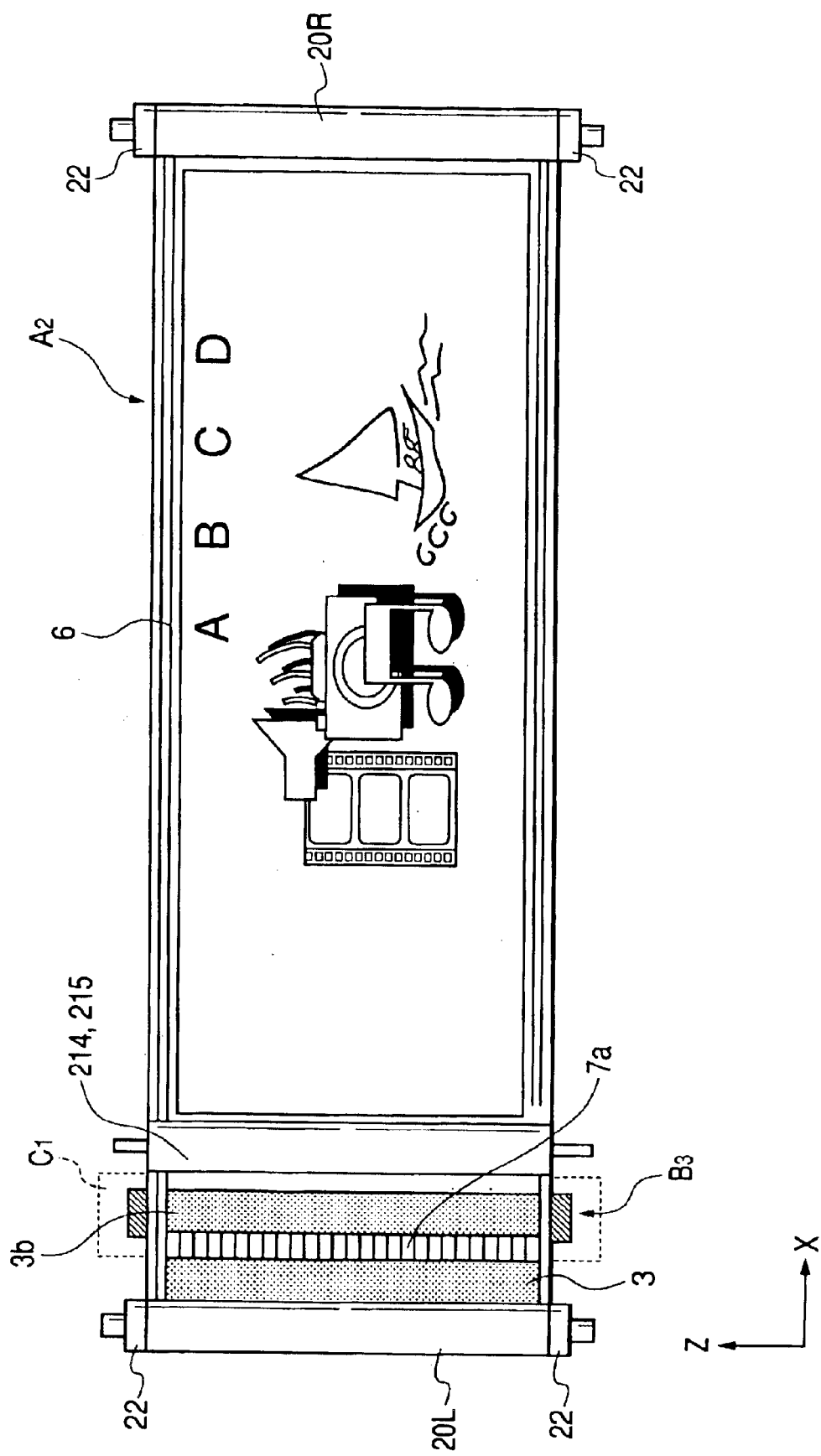
FIG. 12 is a plan view showing the structure of the display apparatus according to the present invention.

In the present example, the display apparatus shown in FIGS. 10, 11 and 12 was prepared. That is, the cylindrical members 20R, 20L were disposed on the opposite edges of the image display portion A$_2$ instead of one edge of the portion, and the first and second wind-up shafts 5R, 5L were disposed in the cylindrical members 20R, 20L. Moreover, similarly as Example 1, the movable member 3 was attached to one wind-up shaft 5R as it was. However, the sheet-like transparent PET (connection member) 6 was attached to the other wind-up shaft 5L, and the PET 6 was bonded to the edge of the movable member 3. Furthermore, the opposite wind-up shafts 5R, 5L were rotated so that the movable member 3 was moved. Additionally, the transparent PET 6 was shaped by hollowing out a portion corresponding to the image display portion.

On the other hand, a developing head (image writing portion) $B_3$ is similar to the developing head $B_1$ of Example 1 in that the head is constituted of the OPC 10, transparent conductive film 11, and LED 12. However, in the present example, the support member 13 was not disposed along the transparent PET 4a, and the squeeze roller 15 shown in FIG. 1 was not disposed.

Moreover, instead of the support member 13 and squeeze roller 15, a pair of rollers 214, 215 as the first pressing member were disposed so that the transparent PET 4a and white PET 4b were held, the rollers were attachable to/detachable from the PET 4a, 4b, and the rollers were movable along the PET 4a, 4b. The other constitution was similar to that of Example 1.

The driving method of the display apparatus in the present example will next be described.

<Cleaning Process>

To perform the present process, as shown in FIG. 11, the developing head $B_3$ and rollers 214, 215 are stopped in the left end of the image display portion $A_2$. Moreover, the respective rollers 214, 215 are moved to the position where the rollers are detached from the PET 4a, 4b, the cleaning bias (+200 V) is applied to the aluminum electrode 3b via the wind-up shaft 5R, and these rollers 214, 215, developing head $B_3$, and movable member 3 are moved in the +X direction. Thereby, the toner 2 sticking to the white PET 4b is adsorbed by the aluminum electrode 3b, and the cleaning process is executed.

<Image Writing Process>

To perform the present process, a developing bias of −100 V is applied to the aluminum electrode 3b drawn between the PET 4a, 4b via the wind-up shaft 5L, and the movable member 3 is rewound in the −X direction.

In this case, the developing head $B_3$ is moved in the −X direction, while the head is disposed opposite to the tip end of the aluminum electrode 3b and contacts the transparent PET 4b. Thereby, the LED 12 of the developing head $B_3$ repeats blinking (in accordance with the given image information) so that the image is formed (see FIG. 12).

On the other hand, after completion of movement of the developing head $B_3$, a pair of rollers 214, 215 holding the PET 4a, 4b as shown in FIGS. 10 and 11 rotate in the direction of a shown arrow and move in the −X direction to the vicinity of the cylindrical member 20L. Moreover, when a length of the roller 215 is set to be shorter than an image region width, the roller can also start moving simultaneously with the movement of the developing head 3. Therefore, the isoparaffin 1 and toner 2 (toner 2 still floating in isoparaffin) are pushed in the shown −X direction, moved toward the cylindrical member 20L similarly as Example 1, and accumulated in the liquid pressure adjustment chamber 9. Additionally, the voltage having the same polarity as that of the toner 2 is applied to the roller 215 to such an extent that the toner 2 is not agitated, and the toner 2 can therefore smoothly be moved.

According to the present example, since the transparent PET 6 used in the present example is shaped by hollowing out the portion corresponding to the image display portion, the display apparatus can be thinned. Moreover, in the image display portion, the transparent PET 6 does not contact the toner 2 sticking to the PET 4b, and the image is not deleted.

Moreover, since the movable member 3 is attached to the wind-up shaft 5R via the transparent PET 6, the member is smoothly moved in the +X direction. Therefore, a sturdy material does not have to be used in the movable member 3, and a degree of freedom in material selection increases as much.

EXAMPLE 5

Figure 13:
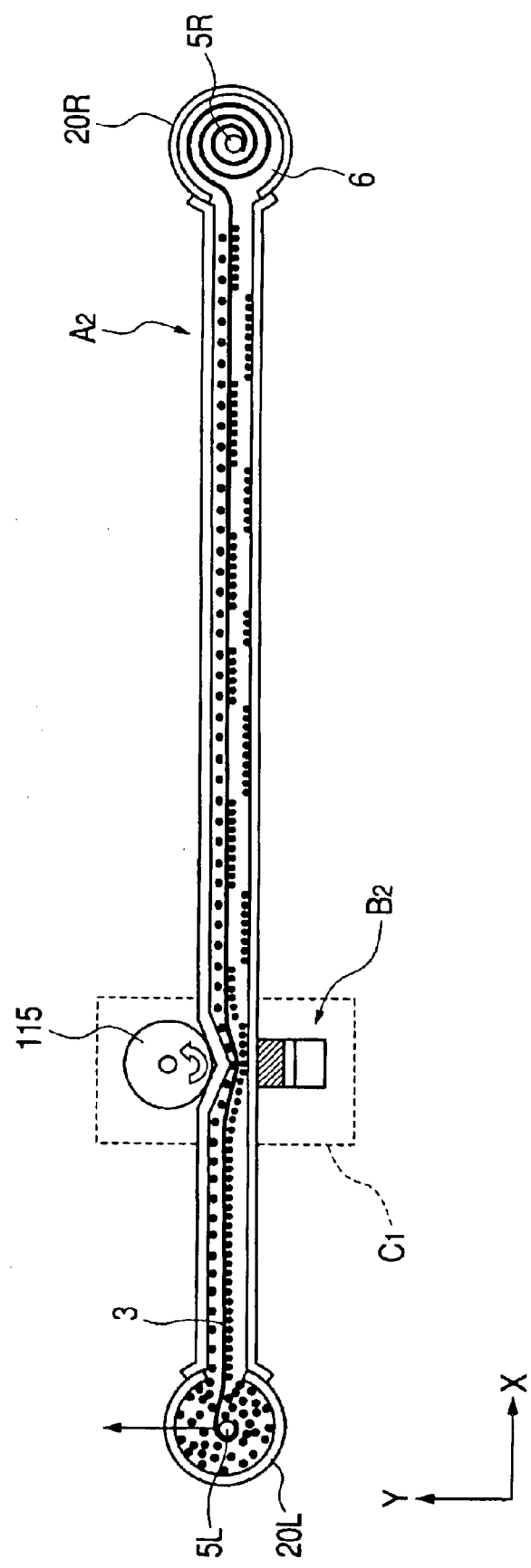
FIG. 13 is a sectional view showing another example of the structure of the display apparatus according to the present invention.
Figure 14:
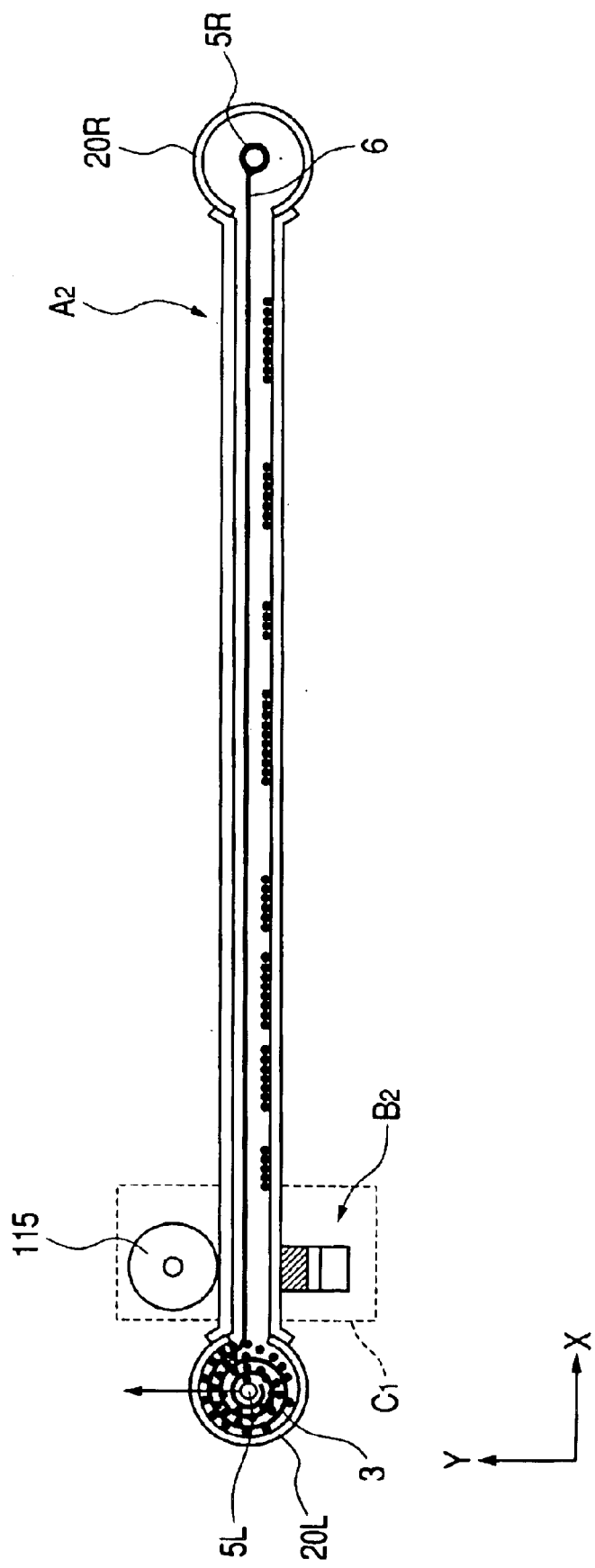
FIG. 14 is an explanatory view of a driving method of the display apparatus.
Figure 15:
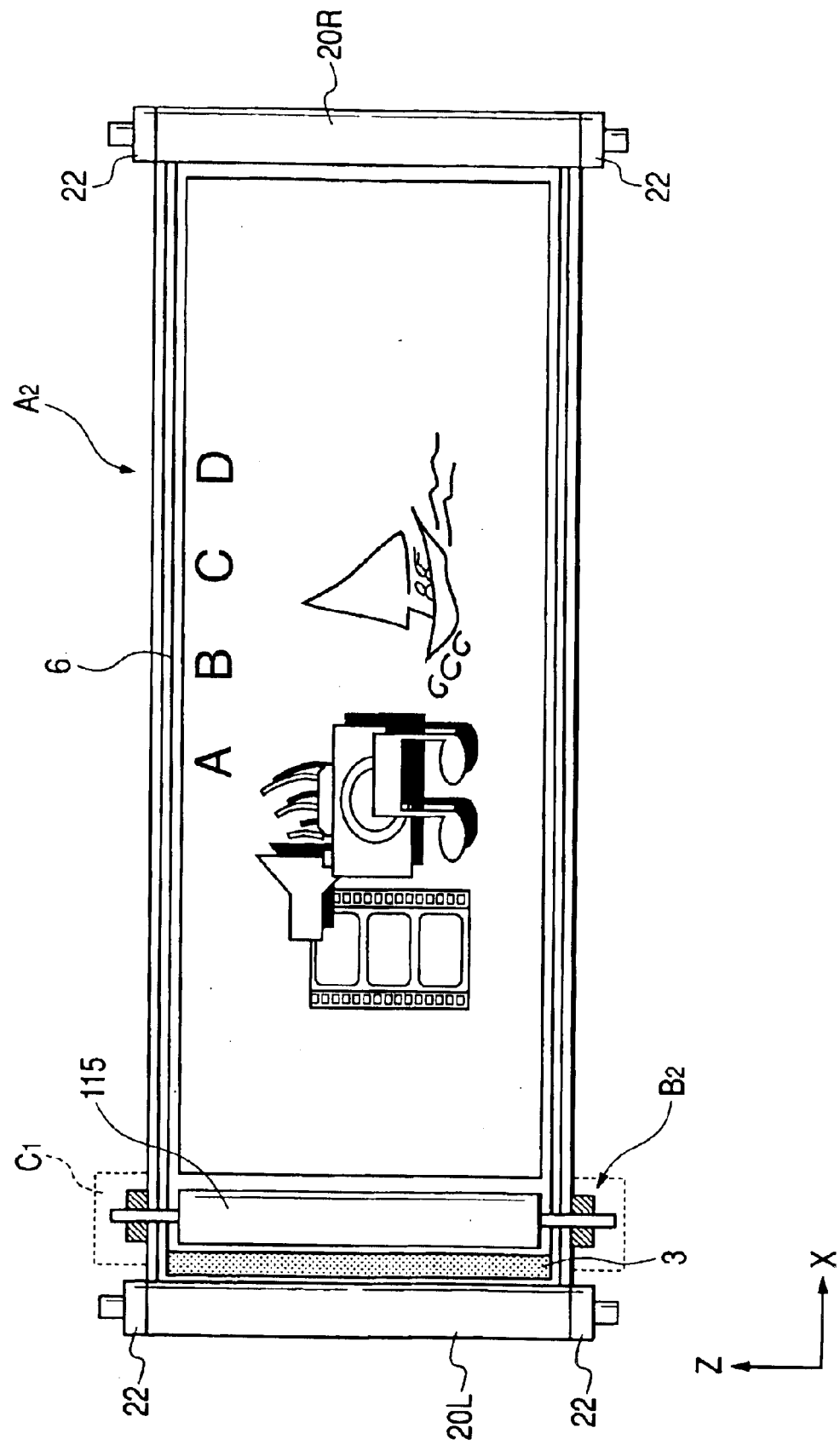
FIG. 15 is a plan view showing the structure of the display apparatus according to the present invention.

In the present example, the display apparatus shown in FIGS. 13, 14 and 15 was prepared by the image display portion $A_2$ of Example 4 and the developing head (image writing portion) $B_2$ of Example 3. That is, the cylindrical members 20R, 20L were disposed on the opposite edges of the image display portion $A_2$ instead of one edge of the portion, and the first and second wind-up shafts 5R, 5L were disposed in the cylindrical members 20R, 20L. Moreover, similarly as Example 3, the movable member 3 was attached to one wind-up shaft 5R as it was. However, the sheet-like transparent PET (connection member) 6 was attached to the other wind-up shaft 5L, and the PET 6 was bonded to the edge of the movable member 3. Furthermore, the opposite wind-up shafts 5R, 5L were rotated so that the movable member 3 was moved. Additionally, the transparent PET 6 was shaped by hollowing out the portion corresponding to the image display portion. The other constitution was similar to that of Example 3.

The driving method of the display apparatus in the present example will next be described.

<Cleaning Process>

To perform the present process, the pressure roller 115 is moved upwards (+Y direction) to the position where the roller is detached from the transparent PET 4a. The developing head $B_2$ is moved downwards (−Y direction) to the position where the head is detached from the white PET 4b. Either a method of moving the movable member 3 in the +X direction without applying the cleaning bias to the member until the tip end of the member abuts on the vicinity of the cylindrical member 20R, and thereafter applying the cleaning bias to the aluminum electrode 3b, or a method of moving the movable member 3 (exactly the aluminum electrode 3b) with the cleaning bias applied thereto in the +X direction is performed. Thereby, the negative-polarity toner 2 sticking to the white PET 4b is stripped from the white PET 4b and adsorbed by the aluminum electrode 3b. Additionally, the pressure roller 115 and developing head $B_2$ are moved together with the aluminum electrode 3b in the +X direction to the vicinity of the end seal 21.

<Image Writing Process>

To perform the present process, the pressure roller 115 is moved downwards (−Y direction) to the position where the roller contacts the transparent PET 4a, and the developing head B2 is moved upwards (+Y direction) to the position where the head contacts the white PET 4b. In this state, the pressure roller 115 is rotated in the counterclockwise direction, and the pressure roller 115 and developing head $B_2$ are moved in the −X direction to the vicinity of the cylindrical member 20L (see FIG. 13). In this case, since the pressure roller 115 presses the image display portion $A_1$ onto the OPC 10, the distance $D_2$ between the aluminum electrode 3b and the white PET 4b is held to be constant. In this state, the developing bias is applied to the aluminum electrode 3b via the wind-up shaft 5L, and the LED 12 of the developing head $B_2$ repeats blinking (in accordance with the given image information) so that the image is formed (see FIG. 15).

Subsequently, the roller 115 and developing head $B_2$ reach the vicinity of the cylindrical member 20L, and are then stopped in the position apart from the PET 4a, 4b.

Additionally, while the roller 115 and developing head $B_2$ are moved, the movable member 3 remains to be stopped. After the end of the movement of the roller 115 and developing head $B_2$, the member is taken up by the wind-up shaft 5L (see FIG. 14).

According to the present example, since the transparent PET 6 used in the present example is shaped by hollowing out the portion corresponding to the image display portion, the display apparatus can be thinned. Moreover, in the image display portion, the transparent PET 6 does not contact the toner 2 sticking to the PET 4b, and the image is not deleted.

Moreover, since the movable member 3 is attached to the wind-up shaft 5R via the transparent PET 6, the member is smoothly moved in the +X direction. Therefore, the sturdy material does not have to be used in the movable member 3, and the degree of freedom in material selection increases as much. Additionally, an effect similar to that of Example 3 is obtained.

EXAMPLE 6

Figure 16:
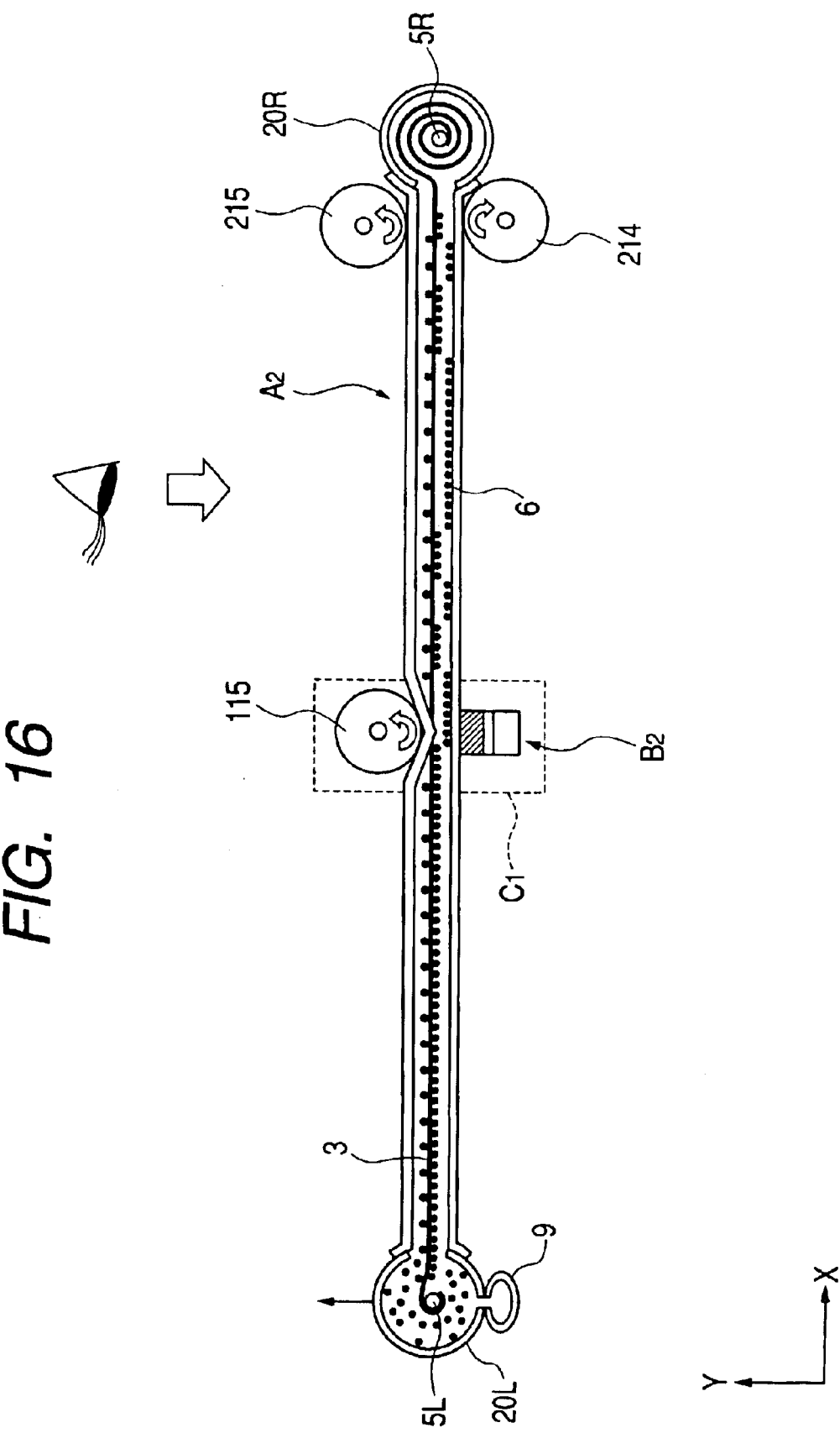
FIG. 16 is a sectional view showing another example of the structure of the display apparatus according to the present invention.
Figure 17:
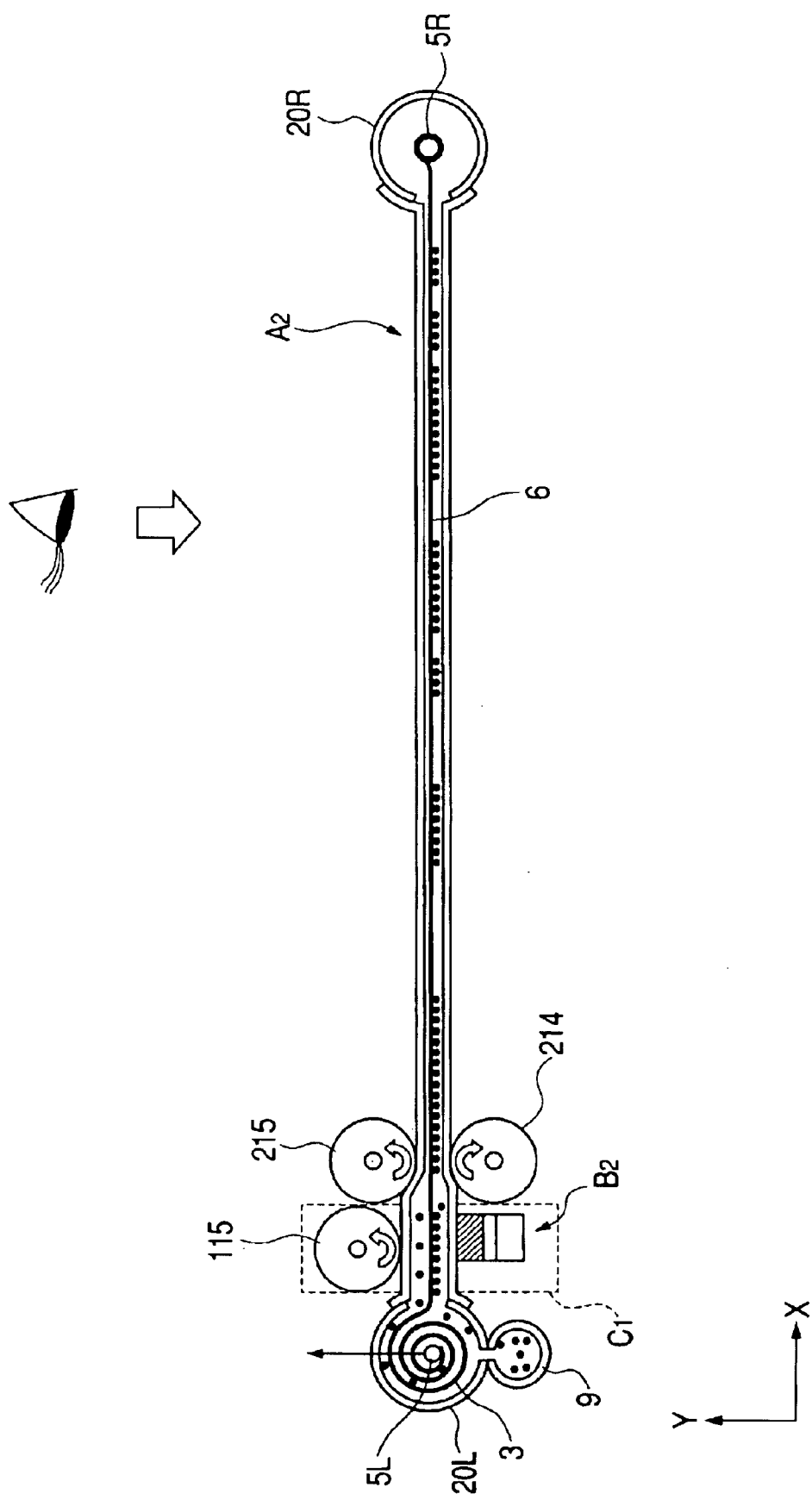
FIG. 17 is an explanatory view of a driving method of the display apparatus.
Figure 18:
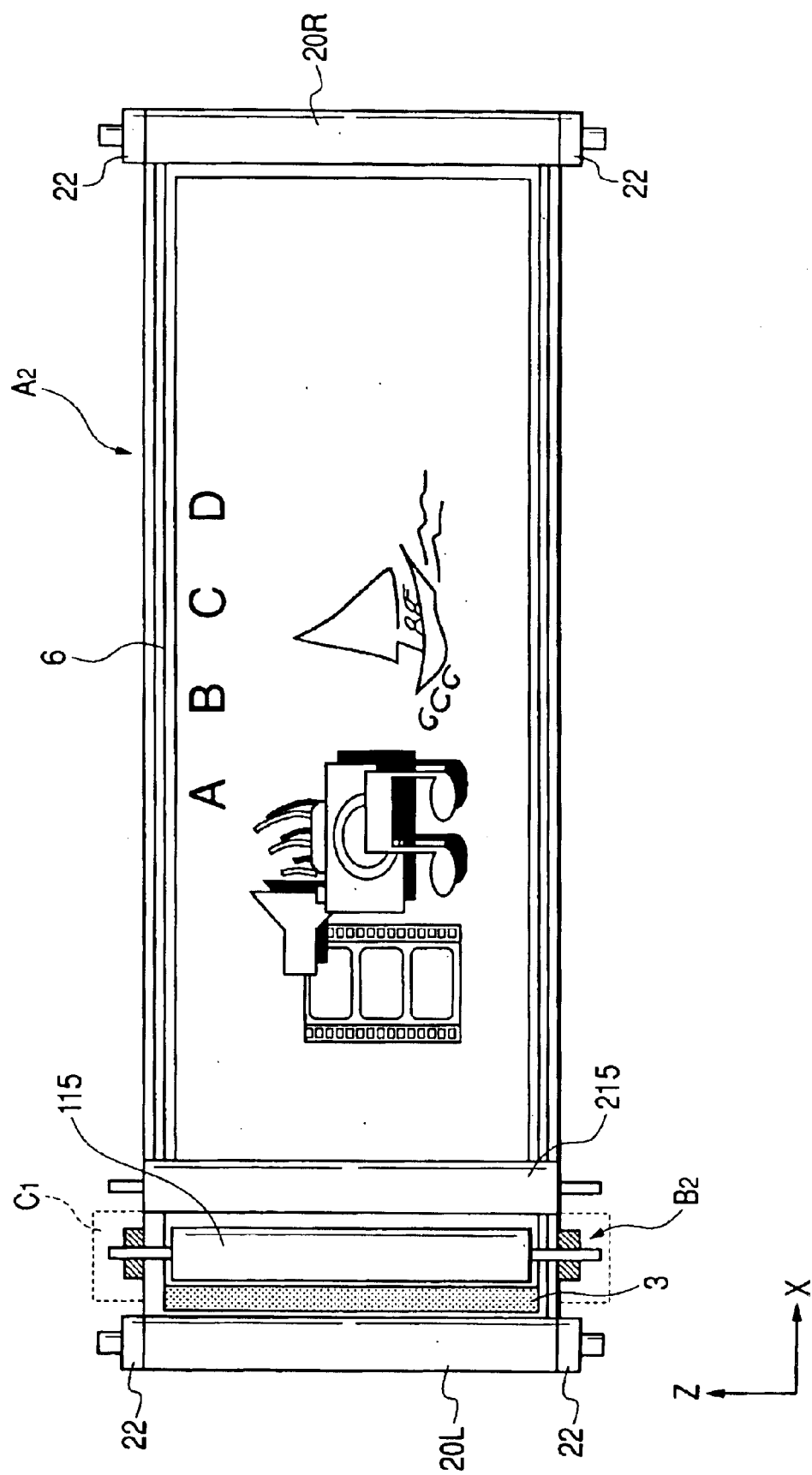
FIG. 18 is a plan view showing the structure of the display apparatus according to the present invention.

In the present example, the pair of rollers 214, 215 as the first pressing members were disposed in the apparatus shown in Example 5, and the display apparatus shown in FIGS. 16, 17 and 18 was prepared.

The driving method of the display apparatus in the present example will next be described.

<Cleaning Process>

To perform the present process, the developing head $B_2$ and pressure roller 115 are stopped in a left end (vicinity of the cylindrical member 20L) of the image display portion $A_2$, and the rollers 214, 215 are also stopped adjacent to the head and roller. Moreover, the respective rollers 214, 215 are moved to the position where the rollers are detached from the PET 4a, 4b.

Thereafter, the cleaning bias (+200 V) is applied to the aluminum electrode 3b via the wind-up shaft 5R, and these rollers 214, 215, 115, developing head $B_2$, and movable member 3 are moved in the +X direction. Thereby, the toner 2 sticking to the white PET 4b is adsorbed by the aluminum electrode 3b, and the cleaning process is executed. Additionally, the developing head $B_2$ and pressure roller 115 may be moved simultaneously with or a little later after the rollers 214, 215. Moreover, the cleaning process ends, when the rollers 214, . . . , developing head $B_2$, and the like reach the right end of the image display portion.

<Image Writing Process>

To perform the present process, the pressure roller 115 is moved downwards (−Y direction) to the position where the roller contacts the transparent PET 4a, and the developing head $B_2$ is moved upwards (+Y direction) to the position where the head contacts the white PET 4b. In this state, the pressure roller 115 is rotated in the counterclockwise direction, and the pressure roller 115 and developing head $B_2$ are moved in the −X direction to the vicinity of the cylindrical member 20L (see FIG. 16). In this case, since the pressure roller 115 presses the image display portion $A_1$ onto the OPC 10, the distance $D_2$ between the aluminum electrode 3b and the white PET 4b is held to be constant. In this state, the developing bias is applied to the aluminum electrode 3b via the wind-up shaft 5L, and the LED 12 of the developing head $B_2$ repeats blinking (in accordance with the given image information) so that the image is formed (see FIG. 18).

Subsequently, the roller 115 and developing head $B_2$ reach the vicinity of the cylindrical member 20L, and are then stopped in the position where the roller and head are detached from the PET 4a, 4b.

Additionally, while the roller 115 and developing head $B_2$ are moved, the movable member 3 remains to be stopped. After the end of the movement of the roller 115 and developing head $B_2$, the member is taken up by the wind-up shaft 5L (see FIG. 14).

Subsequently, the rollers 214, 215 holding the PET 4a, 4b are rotated in the direction of an arrow shown in FIG. 17. Thereby, the rollers 214, 215 move in the shown −X direction, and the isoparaffin 1 and toner 2 (toner 2 still floating in isoparaffin) are pushed in the same direction, and accumulated in the liquid pressure adjustment chamber 9. Additionally, the voltage having the same polarity as that of the toner 2 is applied to the roller 215 to such an extent that the toner 2 is not agitated, and the toner 2 is therefore smoothly moved.

Moreover, these rollers 214, 215 are pressed onto the PET 4a, 4b and held in this state in the left-end position of the image display portion $A_2$.

According to the present example, in addition to effects similar to those of Examples 4 and 5, stability of the image by a holding effect by the PET 4a, 4b can be obtained.

EXAMPLE 7

The display apparatus shown in FIG. 19 was prepared in the present example. That is, the aforementioned image display portion $A_1$ is wound around the outer peripheral surface of the cylindrical member 20L, and the corresponding portion is contained in a case $C_2$. That is, when the wind-up shaft 5L is rotated, the movable member 3 can be taken up or drawn out. Additionally, when the cylindrical member 20L is rotated, the image display portion $A_1$ can be taken up or drawn out. The other constitution was similar to that of Example 1.

According to the present example, a compact display apparatus can be obtained.

EXAMPLE 8

In the present example, the display apparatus shown in FIG. 20 was prepared. That is, the aforementioned image display portion $A_2$ was wound around the outer peripheral surface of the cylindrical member 20L, and the corresponding portion was contained in the case $C_2$. That is, when the wind-up shaft 5L was rotated, the movable member 3 was taken up or drawn out. Additionally, when the cylindrical member 20L was rotated, the image display portion $A_2$ was taken up or drawn out. The other constitution was similar to that of Example 5.

According to the present example, the compact display apparatus can be obtained.

EXAMPLE 9

In the present example, the display apparatus shown in FIG. 23 was prepared. That is, three image display portions $A_1$ and three developing heads (image writing portions) $B_1$ were disposed, and the three image display portions $A_1$ were superposed upon one another in the portion where the image was displayed. Moreover, the PET 4a, 4b of the first and second image display portions $A_1$ from above, and the PET 4a of the third image display portion $A_1$ were transparent, and the PET 4b of the third image display portion $A_1$ was white. Furthermore, color of the toner 2 of the first image display portion $A_1$ was yellow, the toner 2 of the second image display portion $A_1$ was magenta, the toner 2 of the third image display portion $A_1$ was cyan, and the three image display portions $A_1$ displayed different color images, so that color display was performed.

Additionally, for the image writing, similarly as described in Example 1, the developing head $B_1$ was moved in the −X direction to the left end from the right end of the apparatus, the squeeze roller 15 was moved together with the developing head $B_1$, and each image display portion $A_1$ was squeezed. Subsequently, after the developing head $B_1$ and squeeze roller 15 were moved to the left end, transport rollers 314, 315 holding the three image display portions $A_1$ moved in the -X direction to the left end from the right end of the apparatus, and the display portions $A_1$ were bundled.

In the present example, the color display is achieved by the simple constitution.

EXAMPLE 10

In the present example, the display apparatus shown in FIG. 24 was prepared. That is, not the developing head $B_1$ used in Example 1, but the developing head (image writing portion) $B_2$ used in Example 3 was used, but the other respects were similar to those of Example 9.

In the present example, the color display is achieved by the simple constitution.

EXAMPLE 11

In the present example, the display apparatus shown in FIG. 25 was prepared. That is, one image display portion $A_1$ and one developing head (image writing portion) $B_1$ were disposed, the toner (coloring charged particles) 2 was black, an aluminum deposited layer or a white scattered layer was formed as a reflective layer electrically independently for each of CMY on an upper surface of the lower substrate $4b$, and a CMY color filter was formed on an upper surface of the layer. According to the present example, an area in which a set of CMY color filters are disposed functions as one color pixel. When all the CMY color filters are coated with the toner 2, black display is performed. When any of the color filters is not coated, white display is performed.

Additionally, RGB color filters may be used instead of the CMY color filters, and the transparent PET may be used instead of the aluminum deposited PET.

EXAMPLE 12

The display apparatus shown in FIG. 26 was prepared in the present example. That is, not the developing head $B_1$ used in Example 1, but the developing head (image writing portion) $B_2$ used in Example 3 was used, but the other respects were similar to those of Example 11.

In the present example, the color display is achieved by the simple constitution.

What is claimed is:

1. An image display apparatus which comprises an image display portion comprised of a pair of substrates disposed opposite to each other and having a peripheral edge sealed in order to form a sealed gap and an insulating liquid and a plurality of coloring charged particles disposed in the sealed gap, and which controls positions of the coloring charged particles so as to display an image, said apparatus further comprising:

an electrode sheet disposed to be movable in the gap between the pair of substrates;

a writing unit arranged opposite to an electrode surface of the electrode sheet and outside the image display portion; and a unit for moving the electrode sheet and the writing unit in a first direction substantially parallel to the substrates and in a second direction substantially perpendicular to the first direction;

wherein the image display portion has flexibility, a pair of first pressing members is disposed so as to hold the image display portion, and the first pressing members are moved along the substrate while pressing the image display portion as the writing unit moves, and successively push the insulating liquid and the coloring charged particles out of the sealed gap.

2. The image display apparatus according to claim 1, wherein the writing unit has a photosensitive member, an electrode disposed so that the photosensitive member is sandwiched between the electrode sheet and the electrode, and a light source which irradiates the photosensitive member with light.

3. The image display apparatus according to claim 1, wherein the writing unit has electrodes arranged in one row.

4. The image display apparatus according to claim 1, wherein a voltage having the same polarity as a polarity of the coloring charged particle is applied to the first pressing member.

5. The image display apparatus according to claim 1, wherein at least one of the pair of first pressing members is a roller.

6. The image display apparatus according to claim 1, further comprising a liquid pressure adjustment chamber which is connected to the sealed gap, and which contains a surplus insulating liquid generated by operation of the first pressing member.

7. The image display apparatus according to claim 1, wherein the electrode sheet has one edge attached to a first wind-up shaft, and is moved when the wind-up shaft is rotated.

8. The image display apparatus according to claim 1, wherein the electrode sheet has one edge attached to a first wind-up shaft and the other edge attached to a second wind-up shaft, and is moved when these wind-up shafts are rotated.

9. The image display apparatus according to claim 8, wherein the electrode sheet is attached to the first or second wind-up shafts via a connection member.

10. The image display apparatus according to claim 1, wherein the image display portion has flexibility, and is contained while one end of the image display portion is wound.

11. The image display apparatus according to claim 1, further comprising three image display portions and three writing units, wherein the respective image display portions display different color images, and the image display portions are superposed upon one another so that color display is performed.

12. The image display apparatus according to claim 1, further comprising color filters of different colors, wherein the color filters are selectively coated with the coloring charged particles so that color display is performed.

13. The image display apparatus according to claim 1, wherein the image display portion is separated from the writing unit and is portable.

14. An image display apparatus which comprises an image display portion comprised of a pair of substrates disposed opposite to each other and having a peripheral edge sealed in order to form a sealed gap and an insulating liquid and a plurality of coloring charged particles disposed in the sealed gap, and which controls positions of the coloring charged particles so as to display an image, said apparatus further comprising:

a movable sheet member which is disposed to be movable in the gap between the pair of substrates, and which comprises means for stirring the insulating liquid of the image display portion by movement and simultaneously stripping the charged particles from the substrates; and a writing unit which is arranged outside the image display portion, and which moves in a first direction substantially parallel to the substrate and in a second direction substantially perpendicular to the first direction while applying an electric field to the charged particles of the image display portion so as to write the image.

15. The image display apparatus according to claim 14, wherein the means for stirring the insulating liquid and simultaneously stripping the charged particles from the substrates includes a slide contact member facing the substrates.

16. The image display apparatus according to claim 14, wherein the means for stirring the insulating liquid and simultaneously stripping the charged particles from the substrates includes a through hole through which the insulating liquid and the charged particles can pass.

17. The image display apparatus according to claim 14, wherein the coloring charged particle is a magnetic toner, a magnet is disposed opposite to the image display portion, and the magnet is moved along the image display portion to perform cleaning of the coloring charged particles.

18. An image display apparatus which comprises an image display portion comprised of a pair of substrates disposed opposite to each other and having a peripheral edge sealed in order to form a sealed gap and an insulating liquid and a plurality of coloring charged particles disposed in the sealed gap, and which controls positions of the coloring charged particles so as to display an image, said apparatus further comprising:

an electrode sheet which is disposed to be movable in the gap between the pair of substrates, which comprises means for stirring the insulating liquid of the image display portion by movement and simultaneously stripping the charged particles from the substrates, and which applies a cleaning voltage during or after the movement and thereby performs cleaning of the coloring charged particles; and a writing unit which is arranged opposite to an electrode surface of the electrode sheet and outside the image display portion, and which moves in a first direction substantially parallel to the substrate and in a second direction substantially perpendicular to the first direction while applying an electric field to the charged particles of the image display portion so as to write the image.

19. The image display apparatus according to claim 18, wherein the image display portion has flexibility, a first pressing member is disposed so as to hold the image display portion together with the writing unit, and the first pressing member is pressed onto the image display portion while the writing unit writes the image.

20. The image display apparatus according to claim 19, wherein the electrode sheet is stopped while the writing unit writes the image.

21. The image display apparatus according to claim 19, wherein the first pressing member is a rotatably supported roller.

* * * * *

UNITED STATES PATENT AND TRADEMARK OFFICE
CERTIFICATE OF CORRECTION

PATENT NO. : 6,897,840 B2
DATED : May 24, 2005
INVENTOR(S) : Hiroki Kisu

It is certified that error appears in the above-identified patent and that said Letters Patent is hereby corrected as shown below:

<u>Title page,</u>
Item [56], References Cited, FOREIGN PATENT DOCUMENTS, "20011060144 A" should read -- 2001-60144 A -- and "363276620 A" should read -- 63-276620 --.

Signed and Sealed this

Thirteenth Day of June, 2006

JON W. DUDAS
*Director of the United States Patent and Trademark Office*